United States Patent
Dhawan et al.

(10) Patent No.: US 12,351,523 B2
(45) Date of Patent: Jul. 8, 2025

(54) SURFACE TREATMENTS FOR CERAMIC COATED/IMPREGNATED MATERIALS

(71) Applicant: Axiom Materials, Inc., Santa Ana, CA (US)

(72) Inventors: J. Raj K. Dhawan, Santa Ana, CA (US); Antonios Tontisakis, Santa Ana, CA (US); Wylie Simpson, Santa Ana, CA (US); John Lincoln, Santa Ana, CA (US)

(73) Assignee: AXIOM MATERIALS, INC., Santa Ana, CA (US)

( * ) Notice: Subject to any disclaimer, the term of this patent is extended or adjusted under 35 U.S.C. 154(b) by 585 days.

(21) Appl. No.: 17/602,946

(22) PCT Filed: Apr. 10, 2020

(86) PCT No.: PCT/US2020/027583
§ 371 (c)(1),
(2) Date: Oct. 11, 2021

(87) PCT Pub. No.: WO2020/210569
PCT Pub. Date: Oct. 15, 2020

(65) Prior Publication Data
US 2022/0242796 A1    Aug. 4, 2022

Related U.S. Application Data

(60) Provisional application No. 62/832,586, filed on Apr. 11, 2019.

(51) Int. Cl.
*C04B 35/82* (2006.01)
*B32B 5/02* (2006.01)
(Continued)

(52) U.S. Cl.
CPC .............. *C04B 35/82* (2013.01); *B32B 5/022* (2013.01); *B32B 5/024* (2013.01); *B32B 29/02* (2013.01);
(Continued)

(58) Field of Classification Search
CPC ... B32B 18/00; B32B 5/022; B32B 2260/021; B32B 2260/023; B32B 2260/04;
(Continued)

(56) References Cited

U.S. PATENT DOCUMENTS 4,936,939 A    6/1990   Woolum
4,992,318 A    2/1991   Gadkaree
(Continued)

FOREIGN PATENT DOCUMENTS

CA    2088383    1/1993
CA    2598223    8/2006
(Continued)

OTHER PUBLICATIONS

International Search Report and Written Opinion from International Application No. PCT/US2020/027583 mailed Jun. 25, 2020.

*Primary Examiner* — Camie S Thompson
(74) *Attorney, Agent, or Firm* — Honigman LLP; Andrew N. Weber; Jonathan P. O'Brien

(57) ABSTRACT

The present invention relates to surface-treated prepreg composites and corresponding methods of surface treating an inorganic fabric to form a surface-treated fabric reinforced prepreg composite. The method comprises infiltrating an inorganic fabric with a first slurry mixture to form an infiltrated fabric; optionally drying the infiltrated fabric; infiltrating an inorganic paper with a second slurry mixture to form an infiltrated paper; optionally drying the infiltrated
(Continued)

paper; and applying the infiltrated paper to at least one surface of the infiltrated fabric to form a surface-treated prepreg composite.

46 Claims, 7 Drawing Sheets

(51) Int. Cl.
*B32B 29/02* (2006.01)
*C04B 35/626* (2006.01)
*C04B 35/628* (2006.01)
*C04B 35/634* (2006.01)
*C04B 35/64* (2006.01)
*C04B 37/00* (2006.01)

(52) U.S. Cl.
CPC ...... *C04B 35/6264* (2013.01); *C04B 35/6269* (2013.01); *C04B 35/62849* (2013.01); *C04B 35/62886* (2013.01); *C04B 35/62892* (2013.01); *C04B 35/63416* (2013.01); *C04B 35/64* (2013.01); *C04B 37/001* (2013.01); B32B 2255/02 (2013.01); B32B 2255/205 (2013.01); B32B 2260/023 (2013.01); B32B 2260/04 (2013.01); B32B 2262/105 (2013.01); B32B 2307/204 (2013.01); B32B 2605/00 (2013.01); C04B 2235/3463 (2013.01); C04B 2235/5224 (2013.01); C04B 2235/5228 (2013.01); C04B 2235/5232 (2013.01); C04B 2235/5236 (2013.01); C04B 2235/5256 (2013.01); C04B 2235/5436 (2013.01); C04B 2235/5445 (2013.01); C04B 2235/5454 (2013.01); C04B 2235/616 (2013.01); C04B 2235/6562 (2013.01); C04B 2235/661 (2013.01); C04B 2237/341 (2013.01)

(58) Field of Classification Search
CPC ........ B32B 2262/105; B32B 2307/204; C04B 35/82; C04B 35/111; C04B 35/14; C04B 35/486; C04B 35/505; C04B 35/6263; C04B 35/6264; C04B 35/6269; C04B 35/2849; C04B 35/62866; C04B 35/6316; C04B 35/632; C04B 35/62892; C04B 35/3418; C04B 35/64; C04B 35/80; C04B 2238/34; C04B 2238/341; C04B 2238/343; C04B 2238/348; C04B 2238/38; C04B 2238/704; C04B 2235/3463; C04B 2235/3418; C04B 2235/5208; C04B 2235/5224; C04B 2235/5228; C04B 2235/5232; C04B 2235/5236; C04B 2235/5252; C04B 2235/5256; C04B 2235/5436; C04B 2235/528; C04B 2235/5445; C04B 2235/5454; C04B 2235/616; C04B 2235/6562; C04B 2235/661; C04B 2235/77; C04B 2235/963; C04B 37/001

See application file for complete search history.

(56) References Cited

U.S. PATENT DOCUMENTS

| | | | |
|---|---|---|---|
| 5,043,118 | A | 8/1991 | Kim et al. |
| 6,217,997 | B1 | 4/2001 | Suyama et al. |
| 6,767,659 | B1 | 7/2004 | Campbell |
| 6,783,824 | B2 | 8/2004 | Steffier |
| 7,364,807 | B2 | 4/2008 | Boutwell et al. |
| 7,429,424 | B2 | 9/2008 | Boutwell et al. |
| 7,686,990 | B2 | 3/2010 | Gray |
| 7,708,851 | B2 | 5/2010 | Corman et al. |
| 8,313,598 | B2 | 11/2012 | Butler |
| 9,630,885 | B2 | 4/2017 | Goetz et al. |
| 10,071,936 | B2 | 9/2018 | Goetz et al. |
| 11,001,531 | B2 | 5/2021 | Knohl et al. |
| 2002/0079623 | A1 | 6/2002 | Petrak |
| 2002/0197465 | A1* | 12/2002 | Butner ............ C04B 35/634 428/293.4 |
| 2003/0175453 | A1 | 9/2003 | Steffier |
| 2004/0091736 | A1* | 5/2004 | DiChiara, Jr. ...... B64G 1/58 428/689 |
| 2006/0121293 | A1 | 6/2006 | Boutwell et al. |
| 2006/0121295 | A1 | 6/2006 | Boutwell et al. |
| 2006/0147622 | A1 | 7/2006 | Gray |
| 2007/0092762 | A1 | 4/2007 | Corman et al. |
| 2007/0292624 | A1 | 12/2007 | Nagaraj et al. |
| 2011/0259506 | A1* | 10/2011 | Butler ............. C04B 35/185 156/89.27 |
| 2015/0175476 | A1 | 6/2015 | Diss et al. |
| 2016/0083305 | A1 | 3/2016 | Goetz et al. |
| 2016/0159066 | A1 | 6/2016 | Landwehr et al. |
| 2016/0214907 | A1 | 7/2016 | Shim et al. |
| 2016/0336650 | A1 | 11/2016 | Muench et al. |
| 2017/0044069 | A1 | 2/2017 | Harris |
| 2017/0183268 | A1 | 6/2017 | Goetz et al. |
| 2017/0217842 | A1 | 8/2017 | Sato et al. |

FOREIGN PATENT DOCUMENTS

| | | |
|---|---|---|
| CA | 2847667 | 3/2013 |
| CA | 2905677 | 3/2016 |
| CA | 2935952 | 1/2017 |
| CN | 10156322 | 10/2009 |
| CN | 103707564 A | 4/2014 |
| EP | 825163 | 2/1998 |
| EP | 819657 | 11/1999 |
| EP | 1783106 | 3/2016 |
| EP | 3000797 | 3/2016 |
| EP | 2753595 | 5/2016 |
| EP | 3118177 | 1/2017 |
| EP | 3118179 | 1/2017 |
| EP | 3050863 | 10/2017 |
| EP | 3330239 | 6/2018 |
| JP | 2005195231 * | 7/2005 |
| TW | 201217295 A | 5/2012 |
| TW | 201910395 A | 3/2019 |
| WO | 1991/08993 | 6/1991 |
| WO | 2002/085618 | 10/2002 |
| WO | 2018103990 | 6/2018 |
| WO | 2020/210569 | 10/2020 |

* cited by examiner

SURFACE TREATMENTS FOR CERAMIC COATED/IMPREGNATED MATERIALS

CROSS REFERENCE TO RELATED APPLICATION

This U.S. Nonprovisional Application is the 35 USC § 371 national phase of International Application No. PCT/US2020/027583, filed Apr. 10, 2020, which claims priority to U.S. Provisional Application No. 62/832,586, filed on Apr. 11, 2019. Each of these documents is hereby incorporated by reference in its entirety.

FIELD OF THE INVENTION

The present invention provides novel surface-treated fabric-reinforced prepreg composites, ceramic matrix composite ("CMC") materials, and methods for making such composites and materials.

BACKGROUND

Fabric-reinforced CMC materials are well suited for structural applications, especially in the aerospace industry, because of their mechanical properties (e.g., structural flexibility or lack thereof), thermal durability, and chemical stability. Typical techniques used to make fabric-reinforced CMCs include shaping a fibrous material to create a preform. The porosity of the preform is then filled with a ceramic slurry that is then cured and/or sintered to form a CMC material.

Problems associated with such CMC materials are their need to have additional coatings applied to their ceramic coated surface before their final use. These additional coatings commonly require additional drying, sintering, or other processing (e.g., painting) steps that are both time, resource, and energy intensive.

Accordingly, there is a need for both improved techniques and corresponding ceramic slurry compositions that provide alternatives to applying additional coating layers to CMC materials. The development of surface treatments that can impart improved toughness, thermal resistance, and high temperature strength to inorganic fabric materials in addition to more efficient application techniques will provide more choices in managing the materials used for applications dependent on their physical properties at high temperatures.

SUMMARY OF THE INVENTION

One aspect of the present invention provides a method of forming a surface-treated, fabric-reinforced prepreg composite comprising infiltrating an inorganic fabric with a first slurry mixture to form an infiltrated fabric, wherein the slurry mixture comprises an oxide component and a liquid media; infiltrating an inorganic paper with a second slurry mixture to form an infiltrated paper, wherein the second slurry mixture comprises an oxide component and a liquid media; and applying the infiltrated paper to a surface of the infiltrated fabric to form a surface-treated, fabric-reinforced prepreg composite.

Some implementations further comprise drying the infiltrated fabric prior to applying the infiltrated paper to a surface of the infiltrated fabric.

Some implementations further comprise drying the infiltrated fabric and the infiltrated paper concurrently.

In some implementations, the inorganic fabric comprises a plurality of fibers comprising alumina, silica, mullite, zirconia, or any combination thereof. For example, the fiber consist essentially of alumina, silica, mullite, zirconia, or any combination thereof.

In some implementations, the inorganic fabric has a thickness of from about 5 mm to about 75 mm prior to being infiltrated with the first slurry mixture.

In some implementations, the inorganic fabric is woven, nonwoven, or any combination thereof.

In some implementations, the inorganic paper comprises alumina, silica, mullite, zirconia, or any combination thereof. For example, the inorganic paper consists essentially of alumina, silica, mullite, zirconia, or any combination thereof.

In some implementations, the inorganic paper has a thickness of from about 0.1 mm to about 4.99 mm prior to being infiltrated with the second slurry mixture.

In some implementations, the oxide component of the first slurry mixture and/or the second slurry mixture comprises one of more oxides of aluminum, silicon, boron, zirconium, yttrium, or any combination thereof.

In some implementations, the one or more oxides of the first slurry mixture and/or the second slurry mixture is provided as particles comprising spheres, hollow spheres, fibers, whiskers, or any combination thereof.

In some implementations, the first slurry mixture and/or the second slurry mixture further comprises colloidal silica having a mean particle diameter of from about 1 nanometer to about 10 microns.

In some implementations, the first slurry mixture and/or the second slurry mixture further comprises colloidal alumina having a mean particle diameter of from about 1 nanometer to about 10 microns.

In some implementations, the liquid media of the first slurry mixture and/or the second slurry mixture is water, an alcohol, or any combination thereof. For example, the first slurry mixture and/or the second slurry mixture is an aqueous slurry mixture comprising from about 0.1 wt % to about 40 wt % colloidal silica; from about 0.1 wt % to about 10 wt % liquid media soluble polymer; from about 40 wt % to about 85 wt % aluminum oxide powder; and from about 10 wt % to about 60 wt % water. In other examples, the first slurry mixture and/or the second slurry mixture is an aqueous slurry mixture comprising from about 15 to about 30 wt % colloidal silica; from about 0.1 to about 4 wt % liquid media soluble polymer; from about 45 to about 65 wt % aluminum oxide powder; and from about 20 to about 40 wt % water. And, in some implementations, the liquid media soluble polymer is polyvinyl alcohol.

In other implementations, the first slurry mixture and/or the second slurry mixture is an alcohol-based slurry comprising from about 0.1 wt % to about 50 wt % of one or more organic binders, wherein the organic binder comprises silicon resin, polyvinyl butyral, polyvinyl acetate, polylactic acid, or any combination thereof; from about 40 wt % to about 85 wt % aluminum oxide powder; and from about 5 wt % to about 60 wt % alcohol, wherein the alcohol comprises methanol, ethanol, n-propanol, isopropanol, n-butanol, t-butanol, sec-butanol, $C_5$-$C_8$ alcohol, or any combination thereof. For example, the first slurry mixture and/or the second slurry mixture is an alcohol-based slurry comprising from about 5 wt % to about 25 wt % of one or more organic binders, wherein the organic binder comprises silicon resin, polyvinyl butyral, polyvinyl acetate, polylactic acid, or any combinations thereof; from about 45 wt % to about 65 wt % aluminum oxide powder; and from about 30 wt % to about 50 wt % alcohol, wherein the alcohol comprises methanol, ethanol, n-propanol, isopropanol, n-butanol, t-butanol, sec-butanol, $C_5$-$C_8$ alcohol, or any combination thereof.

In some implementations, the pH of the first slurry mixture and/or the second slurry mixture is adjusted to a pH of from about 3 to about 5 using a protic acid.

In some implementations, the first slurry mixture and/or the second slurry mixture further comprises from about 0.1 wt % to about 2 wt % protic acid. For example, the first slurry mixture and/or the second slurry mixture further comprises from about 0.1 wt % to about 1 wt % protic acid.

In some implementations, the first slurry mixture and/or the second slurry mixture further comprises one or more additives comprising inorganic polymeric materials, organic polymeric materials, one or more surfactants, one or more viscosity modifiers, glycols, polyols, or any combination thereof.

Some implementations further comprise curing the fabric-reinforced prepreg composite at a pressure of from about 10 psi to about 200 psi and at a temperature of from about 75° C. to about 500° C.

Some implementations further comprise sintering the fabric-reinforced prepreg composite at a sintering temperature of from about 700° C. to about 1400° C.

In some implementations, the sintering is accomplished using a heating rate of from about 1° C./minute to about 10° C./minute until the sintering temperature is achieved.

Some implementations further comprise blending the first slurry mixture and/or the second slurry mixture using a high shear mixer, a ball mill, an attritor, a planetary, or any combination thereof.

In some implementations, the inorganic fabric is infiltrated with the first slurry mixture heated to an infiltrating temperature of from about 20° C. to about 150° C. and/or the inorganic paper is infiltrated with the second slurry mixture heated to an infiltrating temperature of from about 20° C. to about 150° C.

Another aspect of the present invention provides a method of forming a fabric-reinforced ceramic matrix composite article, the method comprising providing a prepreg composite comprising one or more layers of infiltrated fabric, wherein the infiltrated fabric comprises inorganic fabric infiltrated with a first slurry mixture comprising an oxide component and a liquid media; contacting the prepreg composite with a surface of a preform; applying an infiltrated paper to at least one surface of the prepreg composite to form a surface-treated prepreg composite, wherein the infiltrated paper comprises inorganic paper infiltrated with a second slurry mixture comprising an oxide component and a liquid media; and sintering the surface-treated prepreg composite at a sintering temperature of from about 700° C. to about 1400° C. to form the fabric-reinforced ceramic matrix composite article.

Another aspect of the present invention provides a method of forming a fabric-reinforced ceramic matrix composite article, the method comprising providing a prepreg composite comprising one or more layers of infiltrated fabric, wherein the infiltrated fabric comprises inorganic fabric infiltrated with a first slurry mixture comprising an oxide component and a liquid media; contacting the prepreg composite with a surface of a preform; applying an infiltrated paper to at least one surface of the prepreg composite to form a surface-treated prepreg composite, wherein the infiltrated paper comprises inorganic paper infiltrated with a second slurry mixture comprising an oxide component and a liquid media; curing the surface-treated prepreg composite at a pressure of from about 10 psi to about 200 psi and at a temperature of from about 75° C. to about 500° C.; and sintering the surface-treated prepreg composite at a sintering temperature of from about 700° C. to about 1400° C. to form the fabric-reinforced ceramic matrix composite article.

Another aspect of the present invention provides a method of forming a fabric-reinforced ceramic matrix composite article, the method comprising providing a prepreg composite comprising one or more layers of infiltrated fabric, wherein the infiltrated fabric comprises inorganic fabric infiltrated with a first slurry mixture comprising an oxide component and a liquid media; curing the prepreg composite at a pressure of from about 10 psi to about 200 psi and at a temperature of from about 75° C. to about 500° C. to form a cured prepreg composite; applying an infiltrated paper to at least one surface of the cured prepreg composite to form a surface-treated prepreg composite, wherein the infiltrated paper comprises inorganic paper infiltrated with a second slurry mixture comprising an oxide component and a liquid media; and sintering the surface-treated prepreg composite at a sintering temperature of from about 700° C. to about 1400° C. to form the fabric-reinforced ceramic matrix composite article.

Another aspect of the present invention provides a surface-treated prepreg composite comprising an infiltrated fabric having a top surface layer and a bottom surface layer, wherein the infiltrated fabric comprises (or consists essentially of) fibers comprising alumina, silica, mullite, or any combination thereof, and the top surface layer and the bottom surface layer coat one or more of the fibers and each surface layer comprises from about 40 wt % to about 85 wt % (by weight of the surface layer) aluminum oxide or from about 0.1 wt % to about 40 wt % of silica (by weight of the surface layer); and an infiltrated paper that substantially covers and is in contact with the top surface layer and/or the bottom surface layer of the infiltrated fabric, wherein the infiltrated paper comprises (or consists essentially of) fibers comprising alumina, silica, mullite, or any combination thereof, and the infiltrated paper is infiltrated with a slurry mixture comprising an oxide component and a liquid media.

Another aspect of the present invention provides a surface-treated prepreg composite comprising a plurality of infiltrated fabric layers stacked to be in contact with each other to form a multi-ply fabric-reinforced prepreg composite layup, wherein the prepreg composite layup has a top surface and a bottom surface, each of the infiltrated fabric layers comprises fibers comprising (or consisting essentially of) alumina, silica, mullite, or any combination thereof, and the fibers are coated with a coating that comprises from about 40 wt % to about 85 wt % (by weight of the coating) aluminum oxide or from about 0.1 wt % to about 40 wt % of silica (by weight of the coating); and an infiltrated paper covering at least a portion of the top surface and/or the bottom surface of the prepreg composite layup, wherein the infiltrated paper is infiltrated with a slurry mixture comprising from about 40 wt % to about 85 wt % (by weight of the slurry) aluminum oxide or from about 0.1 wt % to about 40 wt % of silica (by weight of the slurry).

Another aspect of the present invention provides a method of forming a surface-treated fabric-reinforced prepreg composite comprising infiltrating an inorganic fabric with a first slurry mixture to form an infiltrated fabric; drying the infiltrated fabric to form a fabric-reinforced prepreg composite, wherein the first slurry mixture comprises an oxide component, a liquid media, and optionally a protic acid. The method further comprises infiltrating an inorganic paper with a second slurry mixture to form an infiltrated paper, wherein the second slurry mixture comprises an oxide component, a liquid media; applying the infiltrated paper to a surface of the fabric-reinforced prepreg composite; and drying the infiltrated paper to form a paper prepreg composite.

In some implementations, the method further comprises stacking one or more layers of the paper prepreg composite on an external surface (e.g., a top surface and/or a bottom surface) of the fabric-reinforced prepreg composite to form an alternating paper/fabric/paper prepreg composite layup.

In some embodiments, the method further comprises stacking two or more layers of the fabric-reinforced prepreg composite to form a multi-ply fabric-reinforced prepreg composite layup. In some embodiments, the method further comprises stacking one or more layers of the paper prepreg composite on a top surface and/or a bottom surface of the multi-ply fabric-reinforced prepreg composite layup to form a paper and multi-ply fabric-reinforced prepreg composite layup. In some embodiments, the method further comprises alternatively stacking at least one layer of the paper prepreg composite on a top surface and a bottom surface the fabric-reinforced prepreg composite to form a stacked alternating paper/fabric/paper prepreg composite layup wherein the stacked alternating paper/fabric/paper prepreg composite layup includes at least 5 alternating layers.

In some embodiments, the method further comprises autoclaving, oven curing, and/or press curing the infiltrated paper, the paper prepreg composite, the infiltrated fabric, the fabric-reinforced prepreg composite, the alternating paper/fabric/paper prepreg composite layup, the multi-ply fabric-reinforced prepreg composite layup, the paper and multi-ply fabric-reinforced prepreg composite layup, the stacked alternating paper/fabric/paper prepreg composite layup, or any combination thereof, to a preform to form a cured ceramic matrix composite article. In some embodiments, the autoclaving, oven curing, and/or press curing step is performed at a curing pressure of from about 10 psi to about 200 psi. In some embodiments, the method further comprises sintering the cured matrix article to form a fabric-reinforced ceramic matrix composite article. In some embodiments, the sintering step is performed at a sintering temperature of from about 700° C. to about 1400° C. In some embodiments, the sintering temperature is ramped to temperature at a heating rate of from about 1° C./minute to about 10° C./minute.

In some embodiments, the first and/or second slurry mixture is an aqueous slurry comprising from about 0.1 wt % to about 40 wt % of colloidal silica; from about 0.1 wt % to about 10 wt % of liquid media soluble polymer; from about 40 wt % to about 85 wt % of aluminum oxide powder; optionally protic acid sufficient to adjust the pH of the slurry to a pH of from about 3 to about 5 (e.g., from about 0.1 wt % to about 2 wt %); and from about 10 wt % to about 60 wt % of water. In some embodiments, the first and/or second slurry mixture is an aqueous slurry comprising from about 0.1 wt % to about 40 wt % of colloidal alumina; from about 0.1 wt % to about 10 wt % of liquid media soluble polymer; from about 40 wt % to about 80 wt % of aluminum oxide powder; optionally from about 0.1 wt % to about 2 wt % of protic acid to provide a pH from about 3 to about 5; and from about 10 wt % to about 60 wt % of water. The weight percents (wt %) provided herein are by weight of the slurry unless otherwise stated.

In some embodiments, the first and/or second slurry mixture is an aqueous slurry comprising: from about 15 wt % to about 30 wt % colloidal silica; from about 0.1 wt % to about 4 wt % liquid media soluble polymer; from about 45 wt % to about 65 wt % aluminum oxide powder; and from about 20 wt % to about 40 wt % water, and optionally from about 0.1 wt % to about 1 wt % protic acid to provide a pH from about 3 to about 5. In some embodiments, the first and/or second slurry mixture is an aqueous slurry comprising: from about 15 wt % to about 30 wt % colloidal alumina; from about 0.1 wt % to about 4 wt % liquid media soluble polymer; from about 45 wt % to about 65 wt % aluminum oxide powder; and from about 20 wt % to about 40 wt % water, and optionally from about 0.1 wt % to about 1 wt % protic acid to provide a pH from about 3 to about 5. The weight percents (wt %) provided herein are by weight of the slurry unless otherwise stated.

In some embodiments, the first and/or second slurry mixture is an alcohol-based slurry comprising from about 0.1 wt % to about 50 wt % of one or more organic binders including silicon resin, polyvinyl butyral, polyvinyl acetate, polylactic acid, or any combinations thereof; from about 40 wt % to about 85 wt % of aluminum oxide powder; and from about 5 wt % to about 60 wt % of alcohol, wherein the alcohol comprises methanol, ethanol, n-propanol, isopropanol, n-butanol, t-butanol, sec-butanol, $C_5$-$C_8$ alcohol, or any combination thereof. In some embodiments, the first and/or second slurry mixture is an alcohol-based slurry comprising: from about 5 wt % to about 25 wt % of one or more organic binders, wherein the organic binder comprises silicon resin, polyvinyl butyral, polyvinyl acetate, polylactic acid, or any combinations thereof; from about 45 wt % to about 65 wt % aluminum oxide powder; and from about 30 wt % to about 50 wt % alcohol, wherein the alcohol comprises methanol, ethanol, n-propanol, isopropanol, n-butanol, t-butanol, sec-butanol, $C_5$-$C_8$ alcohol, or any combination thereof. The weight percents (wt %) provided herein are by weight of the slurry unless otherwise stated.

In some embodiments, the method further comprises blending the slurry mixture using a high shear mixer, a ball mill, an attritor, a planetary, or any combination thereof.

In some embodiments, the oxide component comprises aluminum oxide, silicon oxide, boron oxide, zirconium oxide, yttrium oxide, mullite, or any combination thereof. In some embodiments, the oxide component is provided as spheres, hollow spheres, fibers, whiskers, or any combination thereof. In some embodiments, the oxide component is colloidal silica having a mean particle diameter of from about 1 nanometer to about 10 microns. In some embodiments, the oxide component comprises colloidal alumina having a mean particle diameter of from about 1 nanometer to about 10 microns. In some embodiments, the liquid media soluble polymer is polyvinyl alcohol. In some embodiments, the slurry mixture further comprises one or more additives comprising inorganic polymeric materials, organic polymeric materials, one or more surfactants, one or more viscosity modifiers, glycols, polyols, or any combination thereof. In some embodiments, the infiltration step is performed at an infiltrating temperature of from about 20° C. to about 150° C. In some embodiments, the nonwoven inorganic fabric comprises at least one of a ceramic fabric or a ceramic mat.

Another aspect of the present invention provides a method of forming a fabric-reinforced ceramic matrix composite article, the method comprises infiltrating an inorganic fabric with a first slurry mixture to form an infiltrated fabric, wherein the first slurry mixture comprises an oxide component, a liquid media, and optionally a protic acid; drying the infiltrated fabric to form a fabric-reinforced prepreg composite; infiltrating an inorganic paper with a second slurry mixture to firm an infiltrated paper, wherein the second slurry mixture comprises an oxide component, a liquid media, and optionally a protic acid; applying the infiltrated paper to at least one surface of the fabric-reinforced prepreg composite to form surface-treated fabric-reinforced prepreg composite; contacting the surface-treated fabric-reinforced prepreg composite to a surface of a preform; curing (e.g. autoclaving, oven curing, and/or press curing) the surface-treated fabric reinforced prepreg composite to the preform to form a cured matrix article; and sintering the cured matrix article to form a fabric-reinforced ceramic matrix composite article.

Embodiments of this aspect of the invention may include one or more of the following optional features. In some embodiments, the slurry mixture is an aqueous slurry comprising from about 0.1 wt % to about 40 wt % of colloidal silica; from about 0.1 wt % to about 10 wt % of liquid media soluble polymer; from about 40 wt % to about 85 wt % of aluminum oxide powder; optionally from about 0.1 wt % to about 2 wt % of protic acid to provide a pH from about 3 to about 5; and from about 10 wt % to about 60 wt % of water. In some embodiments, the slurry mixture is an aqueous slurry comprising from about 0.1 wt % to about 40 wt % of colloidal alumina; from about 0.1 wt % to about 10 wt % of liquid media soluble polymer; from about 40 wt % to about 85 wt % aluminum oxide powder; optionally from about 0.1 wt % to about 2 wt % protic acid to provide a pH from about 3 to about 5; and from about 10 wt % to about 60 wt % water. The weight percents (wt %) provided herein are by weight of the slurry unless otherwise stated.

In some embodiments, the slurry mixture is an aqueous slurry comprising: from about 15 wt % to about 30 wt % colloidal silica; from about 0.1 wt % to about 4 wt % liquid media soluble polymer; from about 45 wt % to about 65 wt % aluminum oxide powder; optionally from about 0.1 wt % to about 1 wt % protic acid to provide a pH from about 3 to about 5; and from about 20 wt % to about 40 wt % water. In some embodiments, the slurry mixture is an aqueous slurry comprising: from about 15 wt % to about 30 wt % colloidal alumina; from about 0.1 wt % to about 4 wt % liquid media soluble polymer; from about 45 wt % to about 65 wt % aluminum oxide powder; optionally from about 0.1 wt % to about 1 wt % protic acid to provide a pH from about 3 to about 5; and from about 20 wt % to about 40 wt % water. The weight percents (wt %) provided herein are by weight of the slurry unless otherwise stated.

In some embodiments, the slurry mixture is an alcohol-based slurry comprising from about 0.1 wt % to about 50 wt % of one or more organic binders including silicon resin, polyvinyl butyral, polyvinyl acetate, polylactic acid, or any combinations thereof; from about 40 wt % to about 85 wt % of aluminum oxide powder; and from about 5 wt % to about 60 wt % of alcohol, wherein the alcohol comprises methanol, ethanol, n-propanol, isopropanol, n-butanol, t-butanol, sec-butanol, any $C_5$-$C_8$ alcohol, or any combination thereof. In some embodiments, the slurry mixture is an alcohol-based slurry comprising: from about 5 wt % to about 25 wt % of one or more organic binders, wherein the organic binder comprises silicon resin, polyvinyl butyral, polyvinyl acetate, polylactic acid, or any combinations thereof; from about 45 wt % to about 65 wt % aluminum oxide powder; and from about 30 wt % to about 50 wt % alcohol, wherein the alcohol comprises methanol, ethanol, n-propanol, isopropanol, n-butanol, t-butanol, sec-butanol, any $C_5$-$C_8$ alcohol, or any combination thereof.

In some embodiments, the method further comprises blending the slurry mixture using a high shear mixer, a ball mill, an attritor, a planetary, or any combination thereof.

In some embodiments, the oxide component comprises aluminum oxide, silicon oxide, boron oxide, zirconium oxide, yttrium oxide, mullite, or any combination thereof. In some embodiments, the oxide component comprises spheres, hollow spheres, fibers, or whiskers of any of the oxide components above, or any combination thereof. In some embodiments, the colloidal silica has a mean particle diameter of from about 1 nanometer to about 10 microns. In some embodiments, the colloidal alumina has a mean particle diameter of from about 1 nanometer to about 10 microns. In some embodiments, the liquid media soluble polymer is polyvinyl alcohol. In some embodiments, the slurry mixture further comprises one or more additives comprising inorganic polymeric materials, organic polymeric materials, one or more surfactants, one or more viscosity modifiers, or any combination thereof.

In some embodiments, the infiltration step is performed at an infiltrating temperature of from about 20° C. to about 150° C.

In some embodiments, the autoclaving, oven curing, and/or press curing step is performed at a curing pressure of from about 10 psi to about 200 psi.

In some embodiments, the sintering step is performed at a sintering temperature of from about 700° C. to about 1400° C. In some embodiments, the sintering temperature is reached by ramping at a heating rate of from about 1° C./minute to about 10° C./minute.

In some embodiments, the nonwoven inorganic fabric comprises at least one of a ceramic fabric or a ceramic mat. In some embodiments, the inorganic fabric has a thickness of from about 5 mm to about 75 mm. In some embodiments, the inorganic fabric has a weight range of from about 10 grams per square meter (gsm) to about 200 gsm prior to infiltration. In some embodiments, the preform comprises a tool, a panel, a support member, a tank, a screen, a shield, a cable, a wire, a fiber, an inorganic article, and organic article, a layered article, a blended article, or any combination thereof.

Another aspect of the present invention provides a paper and multi-ply fabric-reinforced prepreg composite layup comprising a plurality of fabric-reinforced prepreg composite layers stacked to be in contact with each other to form a multi-ply fabric-reinforced prepreg composite layup wherein the plurality of fabric-reinforced prepreg composite layers include a nonwoven inorganic fabric, a woven inorganic fiber, or a combination thereof and a surface layer comprising from about 0.1 wt % to about 40 wt % of colloidal oxide component, from about 0.1 wt % to about 10 wt % of liquid media soluble polymer; and from about 50 wt % to about 99 wt % of aluminum oxide powder; and one or more paper prepreg composite layers coupled to a top surface and a bottom surface of the multi-ply fabric-reinforced prepreg composite layup to form a paper and multi-ply fabric-reinforced prepreg composite layup wherein the one or more paper prepreg composite layers include an inorganic paper and a second surface layer comprising from about 0.1 wt % to about 40 wt % of colloidal oxide component, from about 0.1 wt % to about 10 wt % liquid media soluble polymer; and from about 40 wt % to about 85 wt % aluminum oxide powder.

Another aspect of the present invention provides a paper and fabric-reinforced ceramic matrix composite article comprising a preform autoclaved or press cured and sintered to one or more of an infiltrated paper, a paper prepreg composite, an infiltrated fabric, a fabric-reinforced prepreg composite, an alternating paper/fabric/paper prepreg composite layup, a multi-ply fabric-reinforced prepreg composite layup, a paper and multi-ply fabric-reinforced prepreg composite layup, a stacked alternating paper/fabric/paper prepreg composite layup, or any combination thereof. Each prepreg composite includes at least one surface layer coupled to an infiltrated fabric and/or an infiltrated paper wherein the surface layer comprises from about 0.1 wt % to about 40 wt % of a colloidal oxide component, from about 0.1 wt % to about 10 wt % of liquid media soluble polymer; and from about 40 wt % to about 85 wt % aluminum oxide powder.

Yet another aspect of the present invention provides a method of surface-treating an inorganic fabric and/or inorganic paper to form a surface-treated prepreg composite layup, the method comprising infiltrating an inorganic fabric with a first slurry mixture to form an infiltrated fabric, wherein the slurry mixture comprises from about 0.1 wt % to about 40 wt % of colloidal oxide component, from about 5 wt % to about 40 wt % of liquid media, from about 40 wt % to about 85 wt % of aluminum oxide powder, and optionally a protic acid; drying the infiltrated fabric to form a fabric-reinforced prepreg composite; infiltrating an inorganic paper with a second slurry mixture to form an infiltrated paper, wherein the second slurry mixture comprises from about 0.1 wt % to about 40 wt % colloidal oxide component, from about 5 wt % to about 40 wt % liquid media, from about 40 wt % to about 85 wt % aluminum oxide powder, and optionally a protic acid; drying the infiltrated paper to form a paper prepreg composite; and layering the fabric-reinforced prepreg composite with the paper prepreg composite wherein at least one layer of the fabric-reinforced prepreg composite is alternately stacked with at least one layer of the paper prepreg composite to form an alternating paper/fabric/paper prepreg composite layup. The alternating paper/fabric/paper prepreg composite layup includes at least one paper prepreg layer on each end of the layup and the alternating paper/fabric/paper prepreg composite layup includes at least 3 alternating layers.

Another aspect of the present invention provides a method of treating an inorganic fabric and/or inorganic paper to form a prepreg composite. The method comprises infiltrating an inorganic fabric with a first slurry mixture to form an infiltrated fabric, wherein the slurry mixture comprises from about 0.1 wt % to about 40 wt % of a colloidal oxide component, from about 5 wt % to about 40 wt % of liquid media, from about 40 wt % to about 85 wt % of aluminum oxide powder, and optionally a protic acid; infiltrating an inorganic paper with a second slurry mixture to form an infiltrated paper, wherein the second slurry mixture comprises from about 0.1 wt % to about 40 wt % of a colloidal oxide component, from about 5 wt % to about 40 wt % of liquid media, from about 40 wt % to about 85 wt % of aluminum oxide powder, and optionally a protic acid; layering the infiltrated fabric with the infiltrated paper wherein at least one layer of the infiltrated fabric is alternately stacked with at least one layer of the infiltrated paper to form an alternating infiltrated fabric and paper stack; and drying the alternating infiltrated fabric and paper stack to form an alternating paper/fabric/paper prepreg composite. The alternating paper/fabric/paper prepreg composite includes at least one paper prepreg layer on each end of the layup and the alternating paper/fabric/paper prepreg composite layup includes at least 3 alternating layers.

Another aspect provides a prepreg composite comprising: an inorganic fabric; and an infiltrant system comprising an oxide component, wherein the infiltrant system is substantially homogeneously dispersed throughout the inorganic fabric.

In some embodiments, the oxide component comprises aluminum oxide, silicon oxide, boron oxide, zirconium oxide, yttrium oxide, mullite, or any combination thereof.

In some embodiments, the oxide component comprises spheres, hollow spheres, fibers, whiskers, or any combination thereof.

In some embodiments, the infiltrant system further comprises colloidal silica or colloidal alumina.

In some embodiments, the infiltrant system comprises from about 0.1 to about 40 wt % colloidal oxide component, from about 0.1 wt % to about 10 wt % liquid media soluble polymer; and from about 50 wt % to about 99 wt % aluminum oxide powder. In some embodiments, the infiltrant system comprises from about 15 wt % to about 40 wt % colloidal oxide component, from about 0.1 wt % to about 7 wt % liquid media soluble polymer, and from about 50 wt % to about 80 wt % aluminum oxide powder.

In some embodiments, the infiltrant system comprises from about 0.1 wt % to about 50 wt % of colloidal silica or colloidal alumina; from about 0.1 wt % to about 10 wt % of liquid media soluble polymer; and from about 40 wt % to about 99 wt % of aluminum oxide powder. In some embodiments, the infiltrant system comprises from about 15 to about 40 wt % colloidal silica or colloidal alumina, from about 0.1 to about 7 wt % liquid media soluble polymer, and from about 50 to about 80 wt % aluminum oxide powder.

In some embodiments, the infiltrant system comprises from about 0.1 wt % to about 60 wt % of one or more organic binders selected from silicon resin, polyvinyl butyral, polyvinyl acetate, polylactic acid, or any combinations thereof; and from about 40 wt % to about 99 wt % of aluminum oxide powder. In some embodiments, the infiltrant system comprises from about 15 to about 40 wt % of one or more organic binders selected from silicon resin, polyvinyl butyral, polyvinyl acetate, polylactic acid, or any combinations thereof; and from about 60 wt % to about 85 wt % of aluminum oxide powder.

In some embodiments, the prepreg composite further comprises an inorganic paper in contact with a surface of the prepreg composite thereby defining a surface-treated prepreg composite, wherein the infiltrant system is substantially homogeneously dispersed throughout the inorganic paper.

Another aspect provides a prepreg composite layup comprising two or more prepreg composites stacked to be in contact with each other.

In some embodiments, the prepreg composite layup comprises one or more layers of the inorganic fabric stacked to be in contact with each other, wherein the infiltrant system is substantially homogeneously dispersed throughout the inorganic fabric; and one or more layers of an inorganic paper defining a first surface film, wherein the infiltrant system is substantially homogeneously dispersed throughout the first surface film; wherein the first surface film is stacked on a first side of the one or more layers of inorganic fabric.

In some embodiments, the prepreg composite layup further comprises one or more layers of inorganic paper defining a second surface film, wherein the infiltrant system is substantially homogeneously dispersed throughout the second surface film, and wherein the second surface film is stacked on a second side of the one or more layers of inorganic fabric.

In some embodiments, the first side is a front side and the second side is a back side.

Another aspect provides a ceramic matrix composite article comprising prepreg composite or a prepreg composite layup autoclaved or press cured and sintered to a preform.

Other features and advantages of the invention will be apparent from the following detailed description, figures, and from the claims.

BRIEF DESCRIPTION OF THE DRAWINGS

The following figures are provided by way of example and are not intended to limit the scope of the claimed invention.

DETAILED DESCRIPTION

Figure 1:
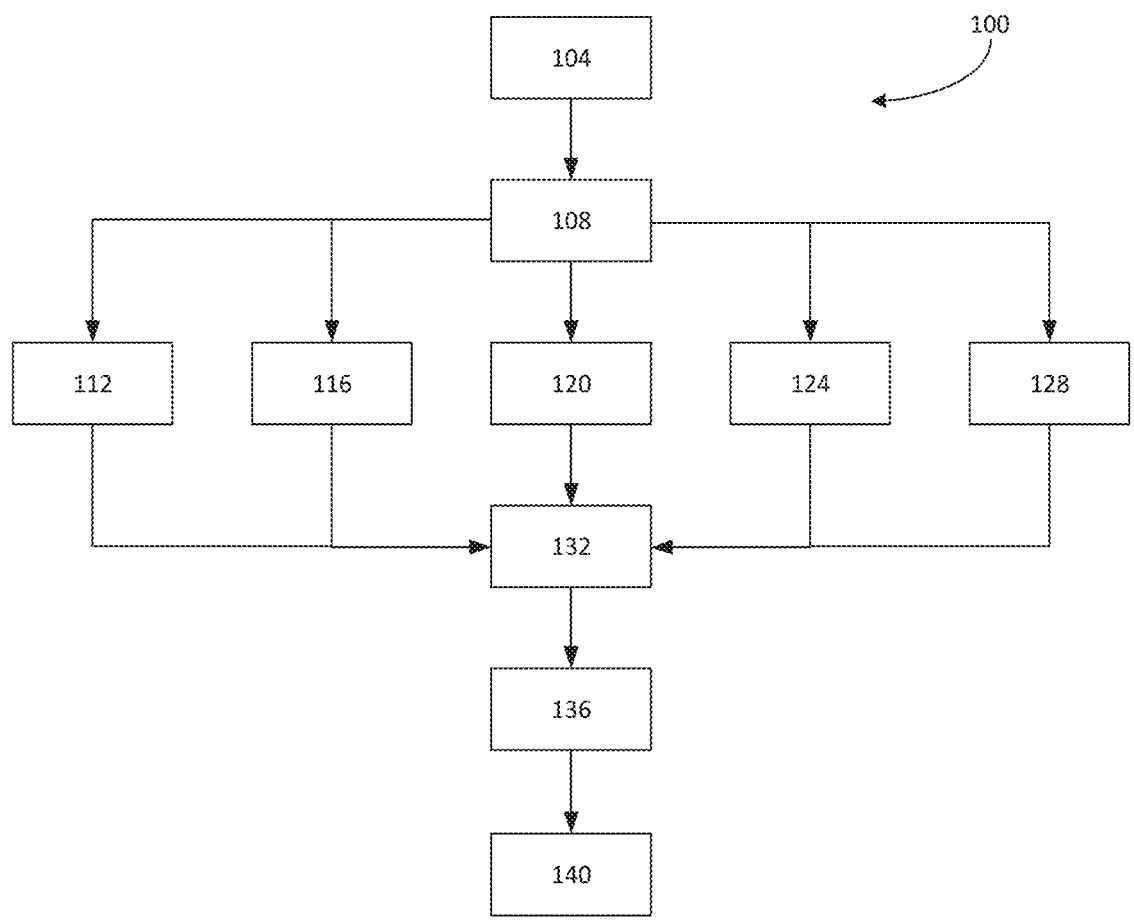
FIG. 1 is a flow diagram illustrating a method of forming a fabric-reinforced ceramic matrix composite article according to an implementation of the present invention.

The present invention provides surface-treated fabric-reinforced prepreg composites and methods of surface treating an inorganic fabric with an inorganic paper to form a reinforced prepreg composite, the method comprising infiltrating an inorganic fabric with a first slurry mixture to form an infiltrated fabric; infiltrating an inorganic paper with a second slurry mixture to form an infiltrated paper; and applying the infiltrated paper to at least one surface of the infiltrated fabric. Some embodiments include drying the infiltrated fabric to form a fabric-reinforced prepreg composite prior to applying the infiltrated paper. And, some embodiments include drying the infiltrated paper prior to applying the infiltrated paper to the fabric-reinforced prepreg composite.

I. DEFINITIONS

As used herein, the following definitions shall apply unless otherwise indicated.

As used herein, the term "fabric" refers to a textile material composed of mechanically interlocked fibers or filaments, wherein the textile material has a thickness of 5 mm or greater prior to infiltration. The textile material may be randomly integrated (nonwoven fabric) or closely oriented by warp and filler strands at right angles to each other (woven fabric). While the term 'fabric' usually refers to wool, cotton, or other synthetic fibers, the fabric used herein can be made from inorganic materials including, but not limited to, glass (including electrical or E-glass), alumina (aluminum oxide), mullite, silica (silicon dioxide), micro glass, carbon (including graphite), activated carbon, aramid, meerschaum (hydrated magnesium silicate), potassium titanate, wollastonite (calcium silicate), poly-p-phenylene-benzoxazole (PBO), alumina-silica, rock wool, boron, quartz, basalt, ceramic, and combinations thereof.

As used herein, the term "paper" refers to an inorganic material formed from randomly oriented inorganic fibers, such as ceramic fibers, that have undergone chemical processing to form a sheet or mat having a thickness less than 5 mm prior to infiltration. A wide variety of sources have been used for such inorganic paper including, but not limited to, glass (including electrical or E-glass), micro glass, alumina, silica, carbon (including graphite), activated carbon, aramid, meerschaum (hydrated magnesium silicate), potassium titanate, wollastonite (calcium silicate), poly-p-phenylene-benzoxazole (PBO), alumina-silica, rock wool, boron, quartz, basalt, ceramic, and combinations thereof. Paper may be produced using a variety of different methods but typically includes the following steps: 1) producing the inorganic fibers with the desired material properties for the paper; 2) addition of fillers or other additives to the inorganic fibers; 3) formation of the paper sheet on a machine used to roll and dry the inorganic paper; 4) calendaring to obtain the desired thickness of the paper; and 5) coating the paper for a final finish.

While a paper and a fabric can be formed from the same fibers, paper is distinguished from a nonwoven fabric in that paper has a thickness of less than 5 mm while a fabric has a thickness of 5 mm or greater, wherein the thickness of each of these materials is evaluated prior to infiltration under ambient conditions.

As used herein, the term "slurry" means a fluid mixture (e.g., a mechanical mixture) comprising solid particles that are suspended in liquid media.

As used herein, the term "infiltrate" means to permeate, adsorb, or wet. In some instances, the act of infiltrating can be accomplished by contacting (e.g., drop casting, painting, immersing, spraying, or the like) an inorganic paper or an inorganic fabric (e.g., a woven or nonwoven inorganic fabric) with a liquid or slurry such that a portion of the liquid or slurry permeates, adsorbs, wets, or is otherwise drawn into at least a portion of the inorganic paper or inorganic fabric.

As used herein, the term "prepreg composite" refers to a partially dry or dry infiltrated fabric (i.e., an infiltrated inorganic fabric), wherein the infiltrated fabric is formed by infiltrating an inorganic fabric with a slurry mixture comprising an oxide component (e.g., an oxide of aluminum, boron, zirconium, or silicon, or mullite) and a liquid. Prepreg composites can undergo thermal (e.g., sintereing)

and other processing conditions to form a ceramic matrix composite material comprising a hardened (or substantially rigid) workpiece.

As used herein, the term "mullite" is a compound comprising $SiO_2$ and $Al_2O_3$, which are present in stoichiometric amounts of $3Al_2O_3 \cdot 2SiO_2$ or $2Al_2O_3 \cdot SiO$. Mullite also includes zirconium coated mullite.

As used herein, the term "layup" refers to a layered or stacked material that is formed from one more (e.g., 1, 2, 3, 4, 5, 6, 7, 8, 9, 10, 1-3, 2-4, 1-5, or 2-5) layers of prepreg composite, wherein the layered or stacked material has not undergone final thermal processing (e.g., sintering) to form a hardened (e.g., substantially rigid) workpiece. For example, each layer of the prepreg composite of the layup has been dried (or partially dried) but not thermally processed to form a hardened workpiece. Other examples of layups include materials formed from one or more layers of prepreg composite and one or more layers of infiltrated paper, wherein the infiltrated paper comprises an external surface of the layup. In other examples, infiltrated paper is interleaved between layers of prepreg composite to form a layup having an alternative sequence of layers.

As used herein, the term "protic acid" refers to an acid that forms hydrogen cations in aqueous solution. Examples, of protic acids include hydrogen halides, (e.g., HCl, HBr, HF, and HI), acetic acid, sulfuric acid, phosphoric acid, and the like.

As used herein, the phrase "stable or chemically feasible" refers to compounds and materials that are not substantially altered when subjected to conditions to allow for their production, detection, and preferably their recovery, purification, and use for one or more of the purposes disclosed herein. In some embodiments, a stable compound or chemically feasible compound is one that is not substantially altered when subjected to a temperature of 40° C. or less, in the absence of moisture or other chemically reactive conditions, for at least a week.

As used herein, the term "and/or" when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

It is noted that the use of the descriptors "first," "second," "third," or the like is used to differentiate separate elements (e.g., solvents, reaction steps, processes, reagents, or the like) and may or may not refer to the relative order or relative chronology of the elements described.

II. PREPREG MATERIALS

One aspect of the present invention provides a layup comprising an infiltrated inorganic paper layer coupled to at least one external surface of a prepreg composite or stack of prepreg composites. The prepreg composite(s) is formed from an inorganic fabric (woven or nonwoven) infiltrated with a first slurry mixture comprising from about 0.1 wt % to about 40 wt % of an oxide component (e.g., a colloidal oxide component), from about 0.1 wt % to about 10 wt % of liquid media soluble polymer; and from about 50 wt % to about 99 wt % of aluminum oxide powder; and the inorganic paper is infiltrated with a second slurry mixture comprising from about 0.1 wt % to about 40 wt % of an oxide component (e.g., a colloidal oxide component), from about 0.1 wt % to about 10 wt % of liquid media soluble polymer; and from about 50 wt % to about 99 wt % of aluminum oxide powder.

A. Inorganic Fabric Substrates.

Fabric substrates useful in the methods, surface-treated prepreg composites, and surface-treated CMC materials of the present invention include inorganic fabrics (e.g., non-woven inorganic fabrics, woven inorganic fabrics, or any combination thereof). These various inorganic fabrics include inorganic fibers that provide structural reinforcement in fabricated composite substrates (e.g., prepreg composites and CMC materials) where these inorganic fibers may take the form of chopped fibers, continuous fibers, filaments, tows, bundles, sheets, plies, or any combination thereof. Continuous fibers may further adopt any of unidirectional (aligned in one direction), multi-directional (aligned in different directions), non-woven, woven, knitted, stitched, wound, needled, and braided configurations, as well as swirl mat, felt mat, and chopped mat structures. Woven fiber structures may comprise a plurality of woven tows, each tow composed of a plurality of filaments, e.g., tens, hundreds, or thousands of filaments.

In some aspects, the inorganic fabric comprises one or more inorganic fibers comprising glass (including electrical or E-glass), micro glass, carbon (including graphite), activated carbon, aramid, meerschaum (hydrated magnesium silicate), potassium titanate, wollastonite (calcium silicate), poly-p-phenylene-benzoxazole (PBO), alumina, silica, alumina-silica, rock wool, boron, quartz, basalt, ceramic, mullite, and any combination thereof.

In some aspects, the fabric may include an unwoven ceramic fabric in the form of a mat, blanket, board, or felt and can comprise fibers of aluminum oxide, silicon oxide, mullite, and/or other inorganic fibers. In such embodiments, the inorganic fibers of the fabric may range from about 40 wt % to about 100 wt % aluminum oxide fibers, from about 0 wt % to about 60 wt % silicon oxide fibers, from about 1 wt % to about 100 wt % of mullite, and/or from about 0% to about 50% of other inorganic fibers. These weight percents are given by weight of the fabric.

Inorganic fabrics used in the present invention have a thickness of 5 mm or greater (e.g., from 5 mm to about 100 mm, from 5 mm to about 75 mm, from 5 mm to about 50 mm, from about 10 mm to about 50 mm, from about 10 mm to about 30 mm, from about 10 mm to about 25 mm, or from about 6 mm to about 25 mm. The thickness of the inorganic fabric is determined prior to infiltration and under ambient conditions.

In some aspects, the inorganic fabric may include an inorganic binder. In other aspects, the inorganic fabric is substantially free of any inorganic or organic binder.

In some aspects, the inorganic fabric may be needled to impart the fabric with increased flexibility.

In some aspects, the inorganic fabric comprises, is formed from, or consists essentially of alumina (e.g., polycrystalline alumina) fibers, silica fibers, mullite fibers, or other ceramic fibers. For instance, the inorganic fabric comprises, is formed from, or consists essentially of alumina (e.g., polycrystalline alumina) fibers, silica fibers, mullite fibers, or any combination thereof.

Commercially available examples of inorganic fabrics include without limitation DENKA® ALLEN® Blanket, DENKA® ALLEN® Felt, MAFTEC® MLS Blanket, CER-EMATERIALS® Ceramic Blanket, UNIFRAX® FIBER-FRAX® Ceramic Mat, and UNIFRAX® FIBERFRAX® Ceramic Blanket.

In some aspects, the inorganic fabric comprises DENKA® ALLEN® Blanket, DENKA® ALLEN® Felt, MAFTEC® MLS Blanket, CEREMATERIALS® Ceramic Blanket, UNIFRAX® FIBERFRAX® Ceramic Mat, UNIFRAX® FIBERFRAX® Ceramic Blanket, or any combination thereof.

In some aspects, the inorganic fabric is thermally stable and can maintain its mechanical properties at standard operating temperatures from about 700° C. to about 1,600° C., from about 800° C. to about 1,400° C., or from about 700° C. to about 1,200° C. In some aspects, the woven and/or nonwoven inorganic fabric has a tensile strength of at least 50 psi, at least 75 psi, at least 100 psi, at least 125 psi, at least 150 psi, or at least 200 psi at its standard operating temperature.

In some aspects, the inorganic fabric has loss on ignition less than about 25%, less than about 15%, less than about 10%, or less than about 5%. For example, the inorganic fabric has loss on ignition of from about 0.001% to about 10% (e.g., from about 0.01% to about 5%). In some aspects, the inorganic fabric has a thermal shrinkage at processing temperature less than about 20%, less than about 15%, less than about 10%, less than about 8%, less than about 6%, less than about 5% or less than about 4%. For example, the inorganic fabric has a thermal shrinkage at processing temperature from about 0.001% to about 10% (e.g., from about 0.01% to about 5%).

B. Inorganic Paper Substrates.

The inorganic paper substrates useful for surface-treating prepreg composites, CMC materials and methods disclosed herein include non-woven, randomly oriented inorganic fibers that provide structural reinforcement in surface-treated prepreg composites and layups thereof where these inorganic fibers may take the form of chopped fibers, continuous fibers, filaments, tows, bundles, sheets, plies, or any combination thereof.

In some aspects, the fibers of the inorganic paper may include, but are not limited to, glass (including electrical or E-glass), micro glass, carbon (including graphite), activated carbon, alumina, silica, meerschaum (hydrated magnesium silicate), potassium titanate, wollastonite (calcium silicate), poly-p-phenylene-benzoxazole (PBO), alumina-silica, mullite, rock wool, boron, quartz, basalt, ceramic, or any combination thereof.

In some aspects, the inorganic paper comprises, is formed from, or consists essentially of alumina (e.g., polycrystalline alumina) fibers, silica fibers, mullite fibers, or other ceramic fibers. For instance, the inorganic paper comprises, is formed from, or consists essentially of alumina (e.g., polycrystalline alumina) fibers, silica fibers, mullite fibers, or any combination thereof.

In some aspects, the inorganic paper can comprise fibers comprising aluminum oxide, silicon dioxide and/or other inorganic fibers. In such embodiments, the inorganic fibers of the paper may range from about 40% to about 100% of aluminum oxide fibers, from about 0% to about 60% of silicon oxide fibers, and/or from about 0% to about 50% of other inorganic fibers.

Inorganic papers useful in the present invention have a thickness of less than 5 mm. For example, the inorganic paper has a thickness of from 0.05 mm to about 4 mm, from about 0.10 mm to about 3.5 mm, from about 0.5 mm to about 3.0 mm, from about 0.1 mm to about 1 mm, or from about 0.75 mm to about 2.75 mm). The thickness of the inorganic paper is determined prior to infiltration and under ambient conditions.

In some aspects, the inorganic paper may include an inorganic binder, an inorganic filler, or combinations thereof. In some aspects, the inorganic filler may include, for example, but is not limited to precipitated calcium carbonate (PCC), ground calcium carbonate (GCC), calcium carbonate, Kaolin clay, talc, titanium dioxide ($TiO_2$), alumina trihydrate, alumina, precipitated silica, silicates (PSS), and combinations thereof.

In some aspects, the inorganic paper may include, for example, but is not limited to a DENKA® ALLEN® Paper, SAFFIL® Paper, 3M® CEQUIN® Paper, CEREMATERIALS® Ceramic Paper, UNIFRAX® FIBERFRAX® Paper, or combinations thereof.

In some aspects, the inorganic paper is thermally stable and can maintain its mechanical properties at standard operating temperatures from about 700° C. to about 1,600° C., from about 800° C. to about 1,400° C., or from about 700° C. to about 1,200° C. In some aspects, the inorganic paper has a tensile strength of at least 50 psi, at least 75 psi, at least 100 psi, at least 125 psi, at least 150 psi, or at least 200 psi at its standard operating temperature. In some aspects, the inorganic paper has a loss on ignition less than about 25%, less than about 15%, less than about 10%, or less than about 5%. For example, the inorganic paper has a loss on ignition of from about 0.01% to about 5%. In some aspects, the inorganic paper has a thermal shrinkage at processing temperature less than about 20%, less than about 15%, less than about 10%, less than about 8%, less than about 6%, less than about 5% or less than about 4%. For example, the inorganic paper has a thermal shrinkage at processing temperature of from about 0.01% to about 5%.

C. Slurry Mixtures.

Slurries useful in the methods and materials of the present invention can infiltrate and/or permeate inorganic paper, inorganic fabric, or any combination thereof. In some aspects, the slurry may include a first slurry used to infiltrate the inorganic fabric and a second slurry used to infiltrate the inorganic paper. The number of slurry mixtures used and their respective labels is not meant to be limiting and merely designates that one or more slurry mixtures may be used to infiltrate, coat, permeate, penetrate, cover, fill, and/or enter the inorganic paper, the inorganic fabric, or any combination thereof. In some aspects, a single slurry mixture or composition may be used to infiltrate both the inorganic fabric and inorganic paper. In other aspects, different slurry mixtures may be used for each of the inorganic fabric and inorganic paper. In still other aspects, a combination of different slurry mixtures may be used to infiltrate each of the inorganic fabric and inorganic paper depending on the desired application of the final CMC material.

In some aspects, the slurry mixture comprises an oxide component. The oxide component can comprise an oxide of aluminum, silicon, boron, sodium, calcium, and the like, or any combination thereof. In some examples, the oxide component of the slurry mixture comprises a combination of aluminum oxide, silicon oxide, boron oxide, mullite, and the like, provided as powders or particles (e.g., solid spheres, hollow spheres, fibers, whiskers, or any combination thereof) suspended in a liquid (under ambient conditions). The oxide component particles used in the slurry mixture may be spherical in shape and may have an average particle size ranging from about 0.1 nanometers to about 10 microns, from about 1 nanometers to about 10 microns, or from about 10 nanometers to about 10 microns as measured by light scattering or microscopy. In some aspects, the oxide component comprises or consists essentially of aluminum oxide, silicon oxide, boron oxide, zirconium oxide, yttrium oxide, mullite, or any combination thereof. In still other aspects, the oxide component comprises particles (e.g., solid spheres, hollow spheres, fibers, whiskers, or any combination thereof) that are provided in the slurry mixture. In some aspects, the weight % concentration of the oxide components in the slurry is from about 40 wt % to about 85 wt %, from about 45 wt % to about 75 wt %, from about 45 wt % to about 65 wt %, or from about 50 wt % to about 85 wt % by weight of the slurry mixture.

In some aspects, the liquid of the slurry comprises water, methanol, ethanol, n-propanol, isopropanol, n-butanol, t-butanol, sec-butanol, glycerol, ethylene glycol, propylene glycol, a $C_5$-$C_8$ straight or branched alkyl alcohol, a polyol, or any combination thereof. In some aspects, the weight % concentration of the liquid in the slurry is from about 5 wt % to about 60 wt %, from about 15 wt % to about 60 wt %, from about 25 wt % to about 50 wt %, from about 5 wt % to about 20 wt %, from about 35 wt % to about 45 wt %, from about 20 wt % to about 40 wt %, from about 30 wt % to about 50 wt %, or from about 40 wt % to about 60 wt %.

In some aspects, the slurry comprises a stabilizing agent, for example, organic and/or inorganic polymeric materials and/or polymer emulsions. In some aspects, the liquid media soluble polymer is polyvinyl alcohol. In some aspects, the slurry mixture further comprises one or more additives comprising inorganic polymeric materials, organic polymeric materials, one or more surfactants, one or more viscosity modifiers, or any combinations thereof.

In some aspects, the slurry comprises a protic acid. For example, a protic acid is added to the slurry mixture in a sufficient amount to give the slurry a pH of from about 3 to about 5. In some examples, the protic acid is hydrochloric acid, nitric acid, phosphoric acid, sulfuric acid, hydrogen fluoride, hydrogen bromide, acetic acid, nitric acid, formic acid, or any combination thereof. In some aspects, the slurry mixture may be substantially homogeneously formed by applying high shear mixing or a milling process including, for example, a ball mill, an attritor, or a planetary.

In some aspects, the slurry mixture is an aqueous slurry comprising from about 0.1 wt % to about 40 wt % colloidal silica; from about 0.1 wt % to about 10 wt % liquid media soluble polymer; from about 40 to about 85 wt % aluminum oxide powder; optionally from about 0.1 wt % to about 2 wt % protic acid; and from about 10 wt % to about 60 wt % water.

In some embodiments, the slurry mixture is an aqueous slurry comprising from about 15 wt % to about 30 wt % colloidal silica; from about 0.1 wt % to about 4 wt % liquid media soluble polymer; from about 45 wt % to about 65 wt % aluminum oxide powder; optionally from about 0.1 wt % to about 1 wt % protic acid; and from about 20 wt % to about 40 wt % water.

In other aspects, the slurry mixture is an aqueous slurry comprising from about 0.1 wt % to about 40 wt % colloidal alumina; from about 0.1 wt % to about 10 wt % liquid media soluble polymer; from about 40 wt % to about 80 wt % aluminum oxide powder; optionally from about 0.1 wt % to about 2 wt % protic acid; and from about 10 wt % to about 60 wt % water.

In some embodiments, the slurry mixture is an aqueous slurry comprising from about 15 wt % to about 30 wt % colloidal alumina; from about 0.1 wt % to about 4 wt % liquid media soluble polymer; from about 45 wt % to about 65 wt % aluminum oxide powder; optionally from about 0.1 wt % to about 1 wt % protic acid; and from about 20 wt % to about 40 wt % water.

In still other aspects, the slurry mixture is an alcohol-based slurry comprising from about 0.1 wt % to about 50 wt % of one or more organic binders including silicon resin, polyvinyl butyral, polyvinyl acetate, polylactic acid, or any combinations thereof; from about 40 wt % to about 85 wt % aluminum oxide powder; from about 5 wt % to about 60 wt % alcohol; optionally from about 0.1 wt % to about 10 wt % liquid media soluble polymer; and optionally from about 0.1 wt % to about 2 wt % protic acid; wherein the alcohol comprises methanol, ethanol, n-propanol, isopropanol, n-butanol, t-butanol, sec-butanol, $C_5$-$C_8$ alcohol, or any combinations thereof.

In some embodiments, the slurry mixture is an alcohol-based slurry comprising from about 5 wt % to about 25 wt % of one or more organic binders, wherein the organic binder comprises silicon resin, polyvinyl butyral, polyvinyl acetate, polylactic acid, or any combination thereof; from about 45 wt % to about 65 wt % aluminum oxide powder; and from about 30 wt % to about 50 wt % alcohol, wherein the alcohol comprises methanol, ethanol, n-propanol, isopropanol, n-butanol, t-butanol, sec-butanol, any $C_5$-$C_8$ alcohol, or any combination thereof.

In still other aspects, the slurry mixture comprises from about 0.1 wt % to about 40 wt % colloidal oxide component (e.g., colloidal silica or colloidal alumina); from about 5 wt % to about 40 wt % of a liquid media; from about 40 wt % to about 85 wt % aluminum oxide powder; optionally from about 0.1 wt % to about 10 wt % liquid media soluble polymer; and optionally a protic acid to provide a pH from about 3 to about 5 (e.g., from about 0.1 wt % to about 2 wt % or from about 0.1 wt % to about 1 wt % protic acid).

In some embodiments, the slurry mixture completely infiltrates the paper or fabric to substantially homogenously or homogenously disperse throughout the paper or fabric. Upon drying, the liquid media in the slurry is removed from the paper or fabric, leaving an infiltrant system of dried slurry (substantially free of liquid media (e.g., substantially free of water or alcohol)) substantially homogenously or homogenously dispersed throughout the paper or fabric.

III. METHODS OF FORMING PREPREG COMPOSITES

The methods described herein describe various methods of forming prepreg composites surface-treated with infiltrated paper, surface-treated layups of prepreg composite(s), in addition to paper and fabric-reinforced ceramic matrix composite articles. The respective methods can comprise infiltrating the inorganic fabric (such as any inorganic fabric described herein) with a first slurry mixture (such as any slurry mixture described herein) to form an infiltrated fabric. The method additionally comprises infiltrating the inorganic paper (such as any inorganic paper described herein) with a second slurry mixture (such as any slurry mixture described herein) to form an infiltrated paper. The method may additionally comprise drying the infiltrated fabric and/or infiltrated paper to form a surface-treated prepreg composite, depending on the methodology chosen to fabricate the final prepreg composite or ceramic matrix composite article.

Referring to FIG. 1, a flow diagram illustrates an exemplary method 100 used to form a surface-treated fabric-reinforced ceramic matrix composite articles is provided. The method 100 may begin with a step 104 of infiltrating the inorganic fabric (woven or nonwoven) with the first slurry mixture to form the infiltrated fabric. The first slurry mixtures may comprise an oxide component, a liquid media, optionally a liquid media soluble polymer, and optionally a protic acid such as any of the slurry mixtures described herein. The first slurry mixture may be mixed or formed using a high shear mixer, a ball mill, an attritor, a planetary, or any combination thereof. In some aspects, the step 104 includes drying the infiltrated fabric to form the prepreg composite.

Next is a step 108 of infiltrating the inorganic paper with the second slurry mixture to form the infiltrated paper. The second slurry mixtures comprises an oxide component, a liquid media, optionally a liquid media soluble polymer, and optionally a protic acid, such as any slurry mixture described herein. The second slurry mixture may be mixed or formed using a high shear mixer, a ball mill, an attritor, a planetary, or any combination thereof. In some aspects, the second slurry mixture may have the same composition as the first slurry mixture. In other aspects, a combination of different slurry mixtures may be used on either the inorganic fabric and/or the inorganic paper. Subsequent applications of the same or different slurry mixtures may be applied when the infiltrated fabric or infiltrated paper are still wet or else may alternatively be applied to the dried infiltrated paper or fabric-reinforced prepreg composite. In some aspects, the step 108 may include drying the infiltrated paper to form a dry or substantially dry infiltrated paper.

Figure 2:
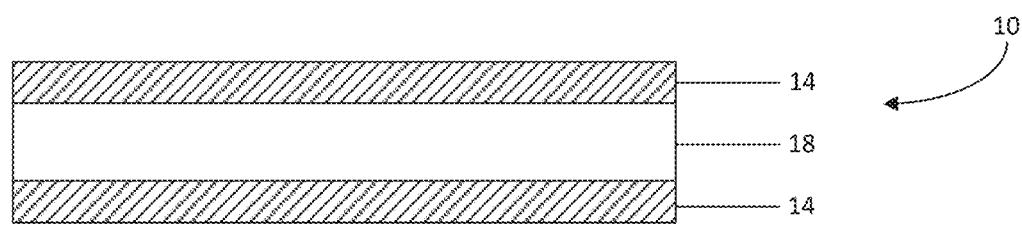
FIG. 2 is a cross-sectional schematic view of an alternating paper and fabric-reinforced prepreg composite layup according to one aspect of the present invention.

In some aspects of FIG. 1, next is a step 112 of stacking or applying one or more layers of the infiltrated paper on a top surface and/or a bottom surface of the fabric-reinforced prepreg composite to form a paper/fabric composite (not shown) or alternating paper/fabric/paper composite or an alternating paper/fabric/paper composite layup. In some aspects, the paper/fabric composite or the alternating paper/fabric/paper composite is fabricated when the stack is formed by layering infiltrated paper on the surface of the infiltrated fabric, each layer still wet from the application of the respective first and second slurry mixtures, and subsequently drying the paper/fabric composite or the paper/fabric/paper stack to form the dried paper/fabric composite or alternating paper/fabric/paper composite. Alternatively, in other aspects, the paper/fabric composite or the alternating paper/fabric/paper prepreg composite layup is fabricated when the stack is formed by layering the fabric-reinforced prepreg composite and infiltrated paper layers, both types of layers already dried from the drying steps referenced in steps 104 and 108. In some aspects, the fabric-reinforced prepreg composite and infiltrated paper layers may be tacky and can be layered to form the paper/fabric composite or alternating paper/fabric/paper prepreg composite layup. Referring now to FIG. 2, a cross-sectional schematic view of the alternating paper/fabric/paper prepreg composite layup 10 is provided. FIG. 2 illustrates the alternate stacking of the infiltrated paper 14 on the top surface and the bottom surface of the fabric-reinforced prepreg composite 18 to form the alternating paper/fabric/paper composite layup 10.

Figure 3:
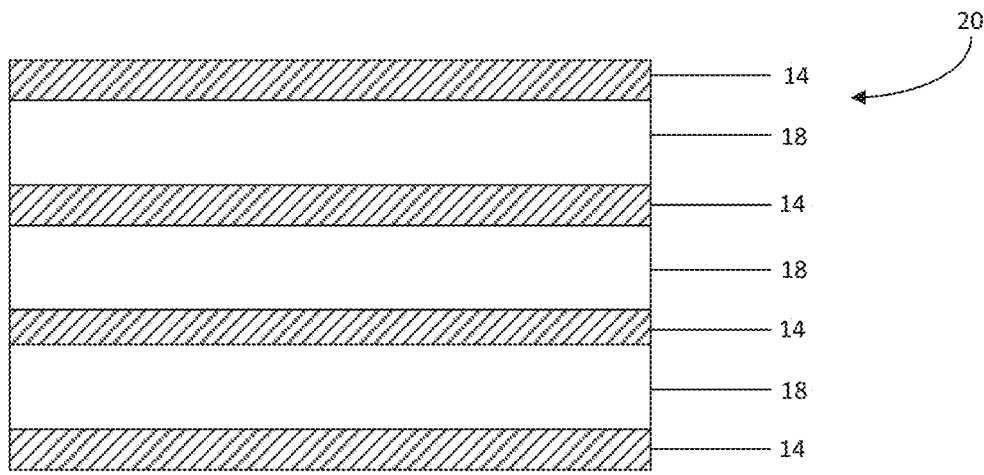
FIG. 3 is a cross-sectional schematic view of a stacked alternating paper and fabric-reinforced prepreg composite layup according to one aspect of the present invention.

In other aspects of FIG. 1, is a step 116 of layering the fabric prepreg composite with the paper prepreg composite wherein at least one layer of the fabric-reinforced prepreg composite is alternately stacked with at least one layer of the paper prepreg composite to form a stacked alternating paper/fabric/paper prepreg composite layup. In some aspects, step 116 may alternatively include a stacked alternating paper/fabric/paper prepreg composite that can be fabricated when the stack is formed by layering infiltrated paper on each side of the infiltrated fabric in a stacked manner where each layer can still be wet from the application of the respective first and second slurry mixtures. The subsequent drying of the infiltrated paper/fabric/paper stack can form the alternating paper/fabric/paper prepreg composite. Referring now to FIG. 3, a cross-sectional schematic view of the stacked alternating paper/fabric/paper prepreg composite layup 20 is illustrated having one layer of the paper prepreg composite 14 stacked on the top and bottom surfaces of the fabric-reinforced prepreg composite layup 18 to form the stacked alternating paper/fabric/paper composite layup 20.

Figure 4:
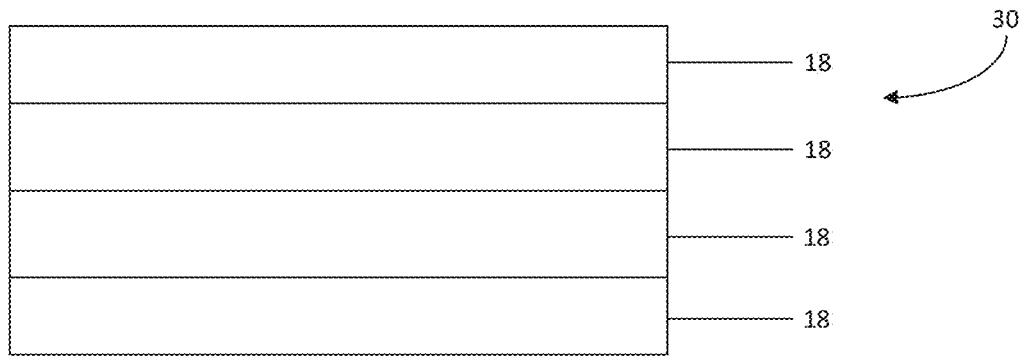
FIG. 4 is a cross-sectional schematic view of a multi-ply fabric-reinforced prepreg composite layup according to one aspect of the present invention.

In still other aspects of FIG. 1, next is a step 120 of stacking two or more layers of the fabric-reinforced prepreg composite to form a multi-ply fabric-reinforced prepreg composite layup. In other aspects, the step 120 may alternatively include stacking and subsequently drying two or more layers of the infiltrated fabric to form a multi-ply fabric-reinforced prepreg composite. Referring now to FIG. 4, a cross-sectional schematic view of the multi-ply fabric-reinforced prepreg composite layup 30 is provided. As illustrated, the stack includes two or more layers of the fabric-reinforced prepreg composite 18 to form the multi-ply fabric-reinforced prepreg composite layup 30. In some aspects, the multi-ply fabric-reinforced prepreg composite layup 30 can include four layers of the fabric-reinforced prepreg composite 18. In other aspects, the multi-ply fabric-reinforced prepreg composite layup 30 may include 2, 3, 4, 5, 6, 7, 8, or greater than 8 layers of the fabric-reinforced prepreg composite 18.

Figure 5:
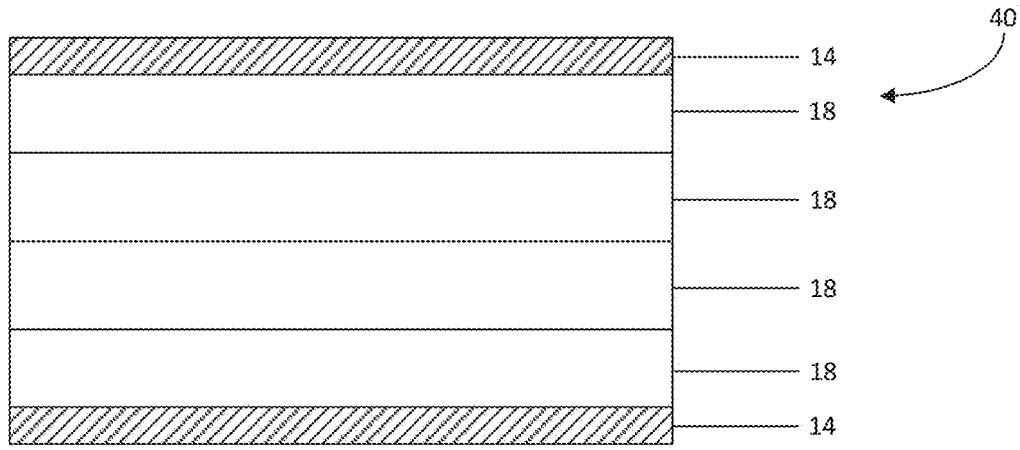
FIG. 5 is a cross-sectional schematic view of a paper and multi-ply fabric-reinforced prepreg composite layup according to one aspect of the present invention.

In additional aspects of FIG. 1, next is a step 124 of stacking one or more layers of the paper prepreg composite on a top surface and a bottom surface of the multi-ply fabric-reinforced prepreg composite layup to form a paper and multi-ply fabric-reinforced prepreg composite layup. In other aspects, the step 124 may include stacking one or more layers of infiltrated paper on the top and bottom surface of the multi-ply infiltrated fabric or the multi-ply fabric-reinforced prepreg composite layup to form a paper and multi-ply fabric-reinforced prepreg composite. Referring now to FIG. 5, a cross-sectional schematic view of the paper and multi-ply fabric-reinforced prepreg composite layup 40 is provided. As illustrated, one or more layers of the paper prepreg composite 14 are stacked on the top and bottom surfaces of the multi-ply fabric-reinforced prepreg composite layup 30 to form the paper and multi-ply fabric-reinforced prepreg composite layup 40.

Figure 6:
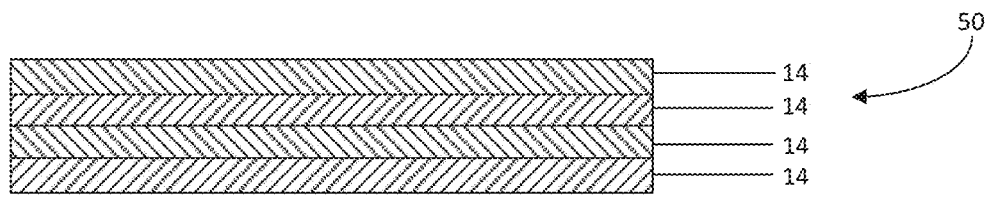
FIG. 6 is a cross-sectional schematic view of a multi-ply paper prepreg composite layup according to one aspect of the present invention.

In still other aspects of FIG. 1, next is a step 128 of stacking two or more layers of the paper prepreg composite to form a multi-ply paper prepreg composite layup. In other aspects, step 128 may alternatively include stacking and the subsequent drying of two or more layers of the infiltrated paper to form a multi-ply paper prepreg composite. Referring now to FIG. 6, a cross-sectional schematic view of the multi-ply paper prepreg composite layup 50 is provided. As illustrated, two or more layers of the paper prepreg composite 18 are stacked to form the multi-ply paper prepreg composite layup 50. In some aspects, the multi-ply paper prepreg composite layup 50 may include four layers of the paper prepreg composite 14. In other aspects, the multi-ply paper prepreg composite layup 50 may include 2, 3, 4, 5, 6, 7, 8, or greater than 8 layers of the paper prepreg composite 18.

Still referring to FIG. 1, next is a step 132 of contacting or coupling at least one of the prepreg composite layups 10, 20, 30, 40, 50 to a surface of a preform. In some aspects, the preform may include but is not limited to, for example, a tool, a panel, a support member, a tank, a screen, a shield, a cable, a wire, a fiber, an inorganic article, an organic article, a layered article, a blended article, or any combination thereof. In some aspects, the layups illustrated in FIGS. 2-6 may be applied to the preform as the respective prepreg composites or prepreg composite layups. In other aspects, the layering provided in FIGS. 2-6 may be applied wet using the respective infiltrated paper and fabric layers directly to the surface of the preform that can be subsequently dried. In some embodiments, at least one of the infiltrated paper, the paper prepreg composite, the infiltrated fabric, the fabric-reinforced prepreg composite, the alternating paper/fabric/paper prepreg composite layup, the multi-ply fabric-reinforced prepreg composite layup, the paper and multi-ply fabric-reinforced prepreg composite layup, the stacked alternating paper/fabric/paper prepreg composite layup, or any combination thereof, may be contacted or coupled to the surface of the preform to form the matrix article.

Next is a step 136 of autoclaving, oven curing, and/or press curing the prepreg to the preform to form a cured matrix article. In some aspects, any combination of heat and/or pressure may be used to cure the prepreg to form the cured matrix article, and this step may generally be referred to as the "curing step". This curing step, e.g., the autoclaving, oven curing, and/or press curing step, includes applying heat and/or pressure to the fabric-reinforced prepreg composite, the paper prepreg composite, the paper and fabric-reinforced stacked prepreg composite layup, the multi-ply fabric-reinforced prepreg composite layup, the multi-ply paper and/or fabric-reinforced prepreg composite layup to the matrix article, to form a cured matrix article. In some aspects, the autoclaving, oven curing, and/or press curing step is performed at a curing pressure of from about 10 psi to about 200 psi, from about 70 psi to about 200 psi, or from about 10 psi to about 20 psi.

Next is a step 140 of sintering the cured matrix article to form the fabric-reinforced ceramic matrix composite article. In some aspects, the sintering step is performed at a sintering temperature of from about 700° C. to about 1400° C., from about 750° C. to about 1400° C., from about 850° C. to about 1300° C., or from about 900° C. to about 1300° C. In other aspects, the sintering temperature is ramped to temperature at a heating rate of from about 1° C./minute to about 50° C./minute, from about 1° C./minute to about 25° C./minute, or from about 1° C./minute to about 10° C./minute.

It is understood that the descriptions outlining and teaching the prepreg composites used to form the fabric-reinforced ceramic matrix composite article previously discussed, which can be used in any combination, apply equally well to the method 100 for forming a fabric-reinforced ceramic matrix composite article or prepreg composites.

The methods for making reinforced prepreg composites and the corresponding structures described herein can provide advantages over the techniques and structures currently produced. For example, rather than the commonly implemented surfacing techniques used to coat just the surfaces or outer portions of inorganic materials, the techniques disclosed herein completely infiltrate the inorganic nonwoven fabric layer, inorganic woven fabric layer, and/or inorganic paper layer to provide a homogeneous ceramic prepreg composite. The uniform distribution of the slurry mixture throughout the fabric and paper layers provide more even material properties in the final manufactured ceramic apparatus. The complete and uniform distribution of the slurry mixture is facilitated by both the composition of the slurry including selecting the proper liquid media in addition to the infiltration conditions including temperature and pressure.

The reinforced prepreg composites disclosed herein additionally provide smoother surfaces that can lead to improved airflow over the respective component. These ceramic surfaces can improve surface thermal cycling by minimizing microcracking thus preventing damage to the surface of composite parts. The techniques used to form these reinforced prepreg composites can improve the efficiency in fabrication by decreasing production time by reducing the time required to produce parts by minimizing the time needed for sand/fill/sand cycles.

The fabric-reinforced prepreg composites fabricated and disclosed herein can be used on complex tools and/or aviation components where both thermal stability and mechanical integrity are critical to the final functionality of the respective apparatus. The fabric-reinforced prepreg composites disclosed herein demonstrate numerous material properties that make them excellent candidates for applications that require tough materials that can be used at high temperatures. For example, the fabric-reinforced prepreg composites and respective layups used to make the CMCs herein have: operating temperatures up to 1600° C.; tensile strengths of at least 50 psi; thicknesses less than 25 mm; loss on ignition of less than 10%; and thermal shrinkages at a processing temperature less than 6%.

IV. EXAMPLES

The following examples are illustrative, but are not meant to be limiting, of the methods and compositions of the present disclosure. Other suitable modifications and adaptations of the variety of conditions and parameters normally encountered in the field, and which are obvious to those skilled in the art, are within the spirit and scope of the disclosure.

Example 1

Figure 7:
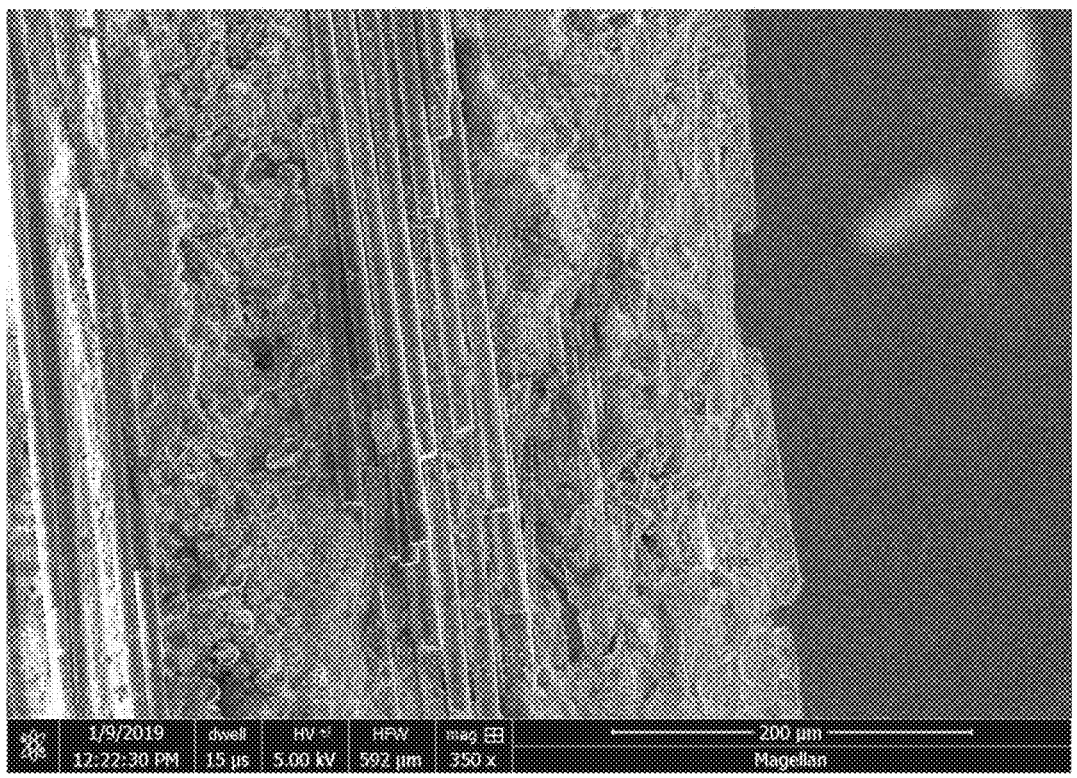
FIG. 7 is a cross-sectional scanning electron microscope (SEM) image of a paper and multi-ply fabric-reinforced prepreg composite according to one aspect of the present invention.
Figure 8:
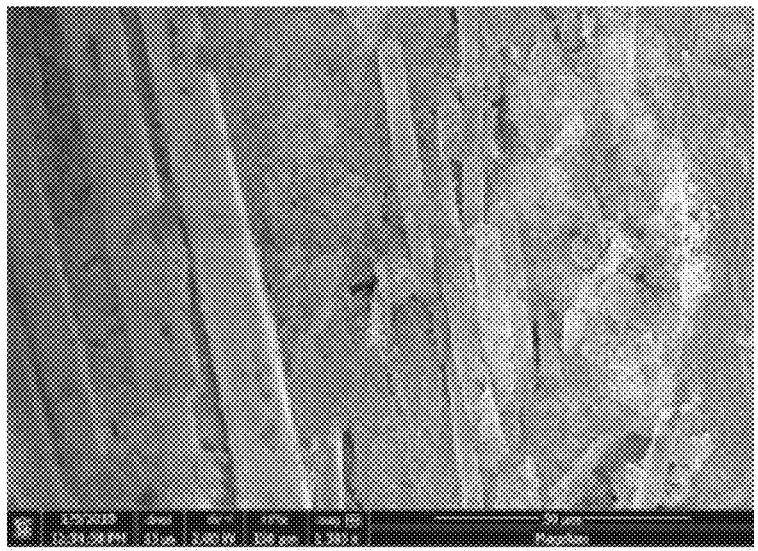
FIG. 8 is a cross-sectional SEM image of a paper and multi-ply fabric-reinforced prepreg composite according to one aspect of the present invention.
Figure 9:
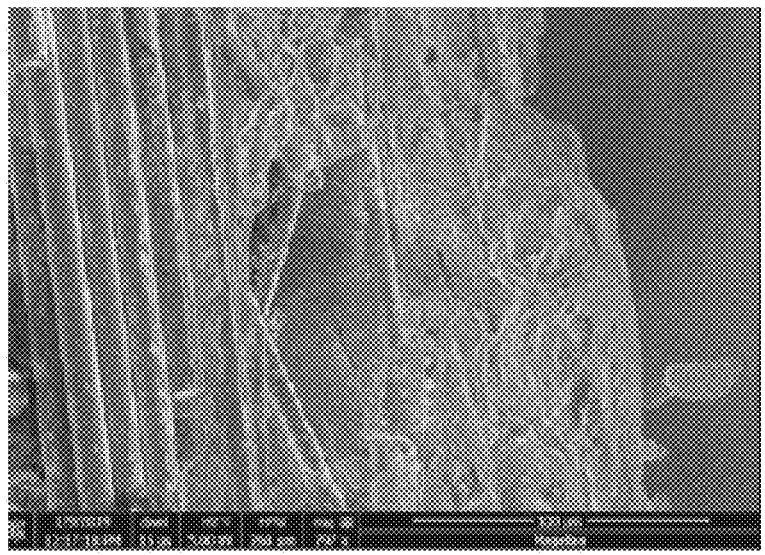
FIG. 9 is a cross-sectional SEM image of a paper and multi-ply fabric-reinforced prepreg composite according to one aspect of the present invention.
Figure 10A:
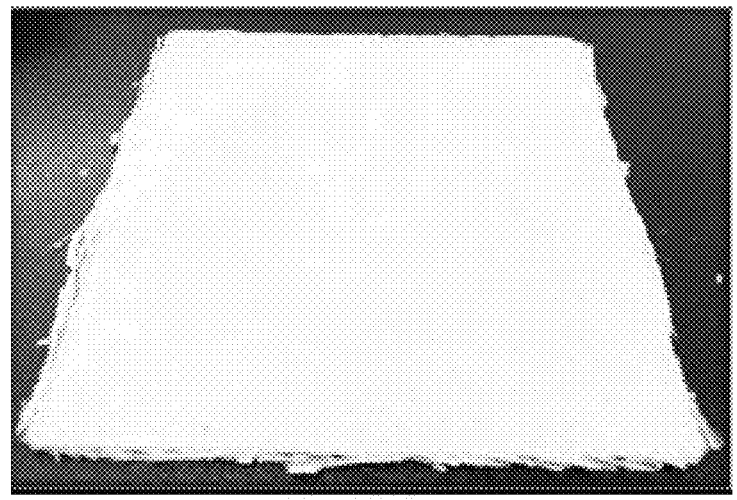
FIG. 10A is a tool side photo image of a paper and multi-ply fabric-reinforced prepreg composite according to one aspect of the present invention.
Figure 10B:
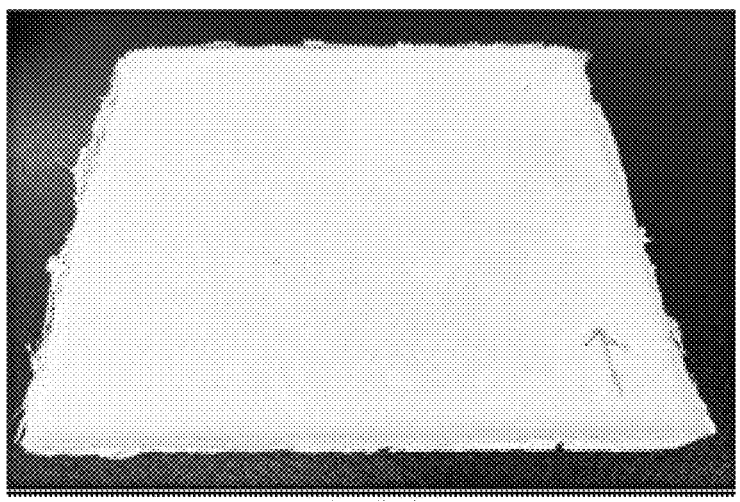
FIG. 10B is a bag side photo image of a paper and multi-ply fabric-reinforced prepreg composite according to one aspect of the present invention.

Three inorganic fabrics, DF11-8HS1500D, DF11-5HS3000D, and DF11-TW4500D (3M™ NEXTEL™) were infiltrated with an aqueous aluminum silicate slurry and dried to form a prepreg sheet. For the DF11-8HS1500D fabric, the prepreg was cut into twelve 6"×6" pieces and a [0°] 12-ply layup was generated. Two 6"×6" ALCEN paper swatches (0.3 mm thickness) were hand prepregged with the Alumina Silicate slurry and placed on the top and bottom surfaces of the 12-ply layup to form a surface treatment (or surface film). The layup was bagged, autoclave cured at 350° F. and 100 psi and sintered at 2000° F. A 0.5"×0.2" specimen was diamond cut from the laminate and ground down to size. This specimen was coated with 8 nm of Iridium with an EMS150T sputter coater. Table 1 below provides the material properties obtained for the Example 1 paper and multi-ply fabric-reinforced prepreg composite layup. FIGS. 7-9 are cross-sectional SEM images of the laminate-surfacing film interface using a FEI Magellan 400 SEM. FIGS. 10A and 10B are tool side and bag side photo images, respectively, of the Example 1 12-ply prepreg layup. The same procedure was used for the DF11-5HS3000D and DF11-TW4500D fabrics.

TABLE 1

| Property | Example 1 |
|---|---|
| Area, in$^2$ (cm$^2$) | 36 (232) |
| Plies | 12 |
| Surface Material | ALCEN Paper 0.3 mm |
| Weight, lb. (g) | 0.35 (159) |
| Thickness, in (mm) | 0.11 (2.8) |
| Fiber volume, % | 42 |
| Density | 2.5 |

The Example 1 paper and multi-ply fabric-reinforced prepreg composite layups using the three different NEXTEL™ fabrics were tested for the effect on surface and areal roughness when used as a surface treatrment or surface film for AX-7810 CMC. The Example 1 paper and multi-ply fabric-reinforced prepreg composite layups tested included the paper surface film (or surface treatment) layer. Corresponding samples without the paper surface film layer (or surface treatment) were tested for comparison ("control"). Surface analysis was performed with the KRUSS surface roughness analyzer (SRA). KRUSS SRA Parameters: itom 3.1.0 software; light intensity 17.6-19%; magnification 10×; measured area 8.5×8 mm; measured height 350 microns; no roughness cut-off; waviness cut-off 0.8 mm. Surface roughness was determined using the confocal microscope technique. Linewise and areal roughness were measured.

Figure 11:
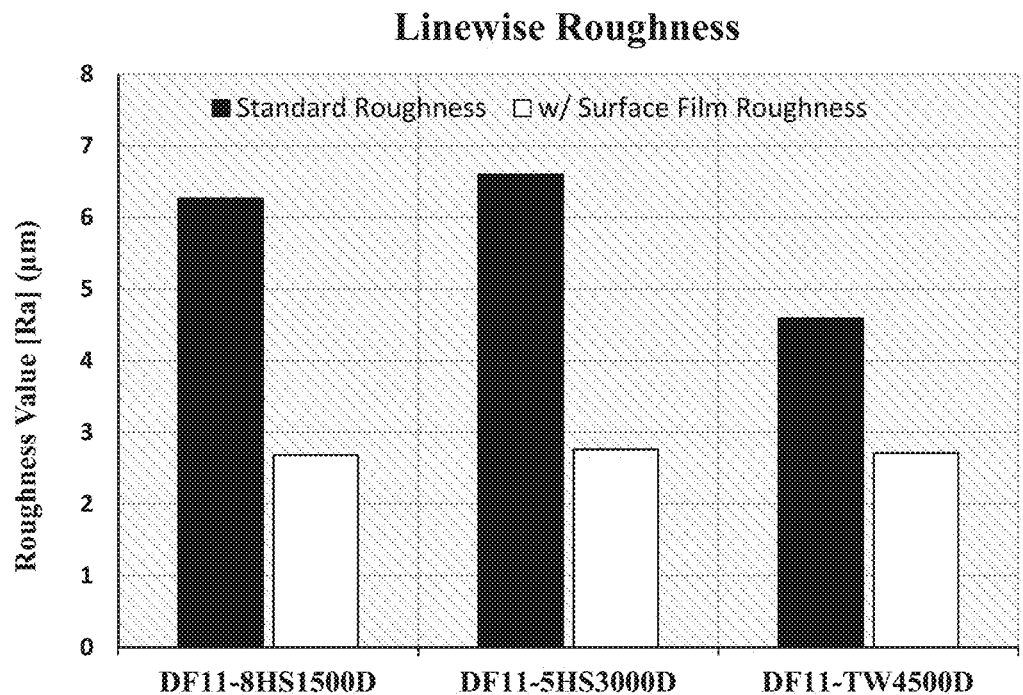
FIG. 11 is a bar graph of linewise roughness for samples of Example 1 and corresponding control samples.

The CMC linewise roughness values are shown in Table 2. The Ra roughness values are plotted in the graph provided in FIG. 11. The use of Example 1 composite layups with the paper surface film resulted in a significant improvement in linewise roughness: ~58% reduction in linewise roughness for 8HS1500D and 5HS3000D laminates with surfacing film; ~41% reduction in linewise roughness for TW4500D laminates with surfacing film; surfacing film roughness values were consistent across all fabric weaves (~2.7 μm).

TABLE 2

| Axiom CMC Prepreg | AX-7810-DF11-8HS1500D | | AX-7810-DF11-5HS3000D | | AX-7810-DF13-TW4500D | |
| --- | --- | --- | --- | --- | --- | --- |
| | Control | Example 1 | Control | Example 1 | Control | Example 1 |
| Ra (μm) | 6.27 | 2.68 | 6.60 | 2.76 | 4.59 | 2.71 |
| Rq (μm) | 9.22 | 3.05 | 9.70 | 3.47 | 7.40 | 3.18 |
| Rz (μm) | 35.2 | 11.3 | 41.9 | 14.5 | 27.2 | 11.7 |
| Rmax (μm) | 67.2 | 14.0 | 67.6 | 20.8 | 70.2 | 14.4 |

Figure 12:
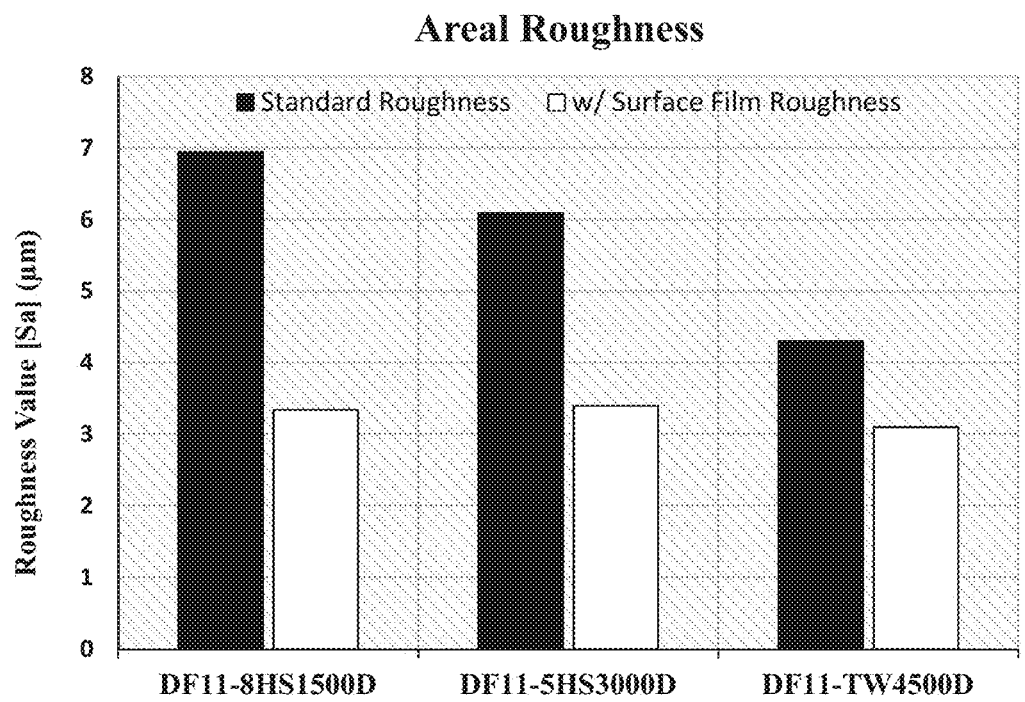
FIG. 12 is a bar graph of areal roughness for samples of Example 1 and corresponding control samples.

The CMC areal roughness values are shown in Table 3. The Sa roughness values are plotted in the bar graph provided in FIG. 12. The use of Example 1 composite layups with the paper surface film resulted in a significant improvement in areal roughness: ~52% reduction in areal roughness for 8HS1500D laminates; ~44% reduction in areal roughness for 5HS3000D laminates; ~28% decrease in areal roughness for TW4500D laminates. Areal roughness decreases in standard laminates with increasing denier. Surfacing film roughness values were somewhat consistent across all fabric weaves (~3.3 μm).

TABLE 3

| CMC Prepreg | AX-7810-DF11-8HS1500D | | AX-7810-DF11-5HS3000D | | AX-7810-DF13-TW4500D | |
| --- | --- | --- | --- | --- | --- | --- |
| | Control | Example 1 | Control | Example 1 | Control | Example 1 |
| Sa (μm) | 6.94 | 3.34 | 6.09 | 3.40 | 4.30 | 3.10 |
| Sq (μm) | 10.2 | 5.12 | 9.31 | 5.02 | 6.48 | 3.89 |
| Sv (μm) | −65.7 | −96.7 | −82.2 | −173 | −76.0 | −103.6 |
| Sp (μm) | 84.4 | 19.1 | 49.8 | 61.9 | 52.5 | 167 |
| Sz (μm) | 150 | 116 | 132 | 235 | 128 | 271 |
| Sz10 (μm) | 109 | 109 | 122 | 145 | 104 | 174 |

The Example 1 paper and multi-ply fabric-reinforced prepreg composite layups using the three different NEXTEL™ fabrics were tested for the effect on dielectric properties when used as a surface film for AX-7810 CMC. The Example 1 paper and multi-ply fabric-reinforced prepreg composite layups tested included the paper surface film layer. Corresponding samples without the paper surface film layer were tested for comparison ("control"). Dielectric testing was performed on split post dielectric resonator (SPDR), using IEC 61189-2-721, and tested at a frequency of 9.5 GHz, typical Dk resolution <0.1, and tan delta 0.00001. For reference, alumina, mullite, and silica have dilectric constants ($\varepsilon_r$) of 10, 7, and 4, respectively.

Figure 13:
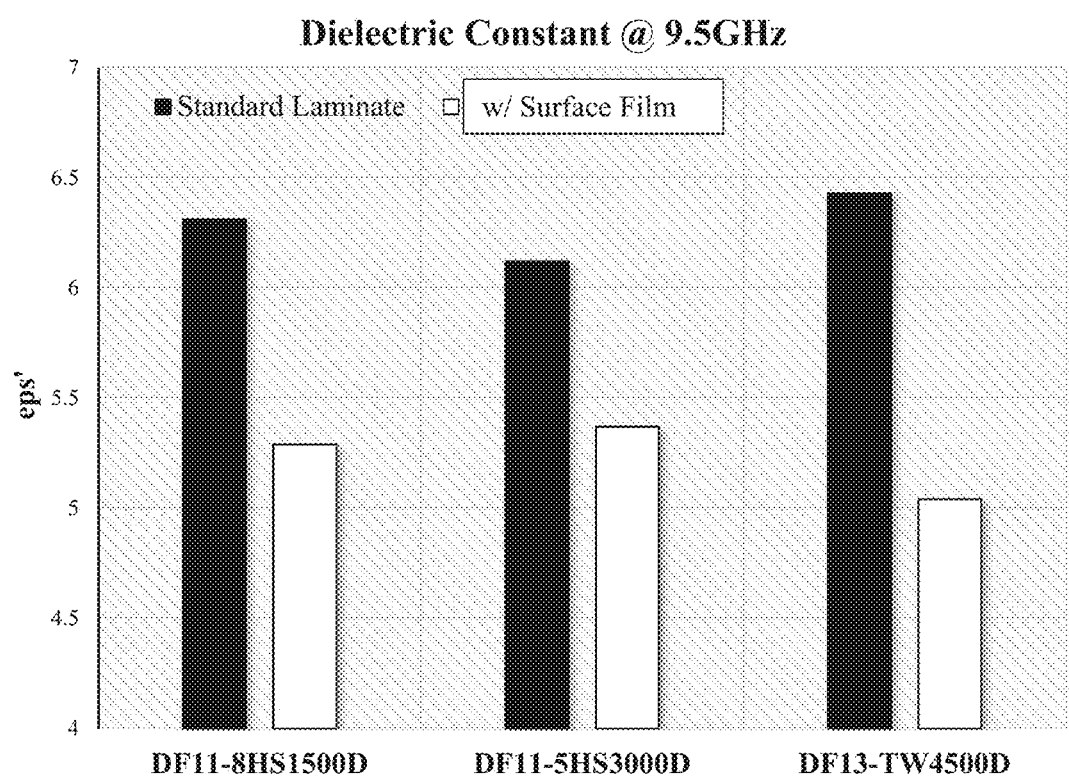
FIG. 13 is a bar graph of dielectric constant values for samples of Example 1 and corresponding control samples.

The dielectric properties are shown in Table 4. The dielectric constant (eps') values are plotted in the bar graph provided in FIG. 13. The use of Example 1 composite layups with the paper surface film resulted in a significant improvement in dielectric properties: ~17% reduction in dielectric constant; significant reduction in dielectric constant (thought to be a factor of coupon thickness, standard prepreg plycount, and dielectric response of anisotropic matrix rich surfacing film perpendicular to the beam).

TABLE 4

| Fabric | DF-11 Control | DF-11 Example 1 | DF-11 Control | DF-11 Example 1 | EXP Control | EXP Example 1 |
| --- | --- | --- | --- | --- | --- | --- |
| Denier, g/9000 m | 1,500 | 1,500 | 3,000 | 3,000 | 4,500 | 4,500 |
| Weave | 8HS | 8HS | 5HS | 5HS | 2 × 2 Twill | 2 × 2 Twill |
| Thickness (mm) | 0.799 | 0.897 | 0.878 | 0.802 | 0.768 | 0.95 |
| Plies of Prepreg | 4 | 3 | 4 | 3 | 3 | 2 |
| Dielectric Constant (eps') | 6.31 | 5.29 | 6.12 | 5.37 | 6.43 | 5.04 |

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:
1. A method of forming a surface-treated, fabric-reinforced prepreg composite comprising:

infiltrating an inorganic fabric with a first slurry mixture to form an infiltrated fabric, wherein the first slurry mixture comprises an oxide component and a liquid media;

infiltrating an inorganic paper with a second slurry mixture to form an infiltrated paper, wherein the second slurry mixture comprises an oxide component and a liquid media; and applying the infiltrated paper to a surface of the infiltrated fabric to form a surface-treated, fabric-reinforced prepreg composite, wherein the inorganic fabric has a thickness of from about 5 mm to about 75 mm prior to being infiltrated with the first slurry mixture, wherein the inorganic paper has a thickness of from about 0.1 mm to about 4.99 mm prior to being infiltrated with the second slurry mixture, and wherein the inorganic paper includes non-woven, randomly oriented inorganic fibers that provide structural reinforcement in surface-treated prepreg composites and layups thereof where these inorganic fibers may take the form of chopped fibers, continuous fibers, filaments, tows, bundles, sheets, plies, or any combination thereof.

2. The method of claim 1, further comprising drying the infiltrated fabric prior to applying the infiltrated paper to a surface of the infiltrated fabric.

3. The method of claim 1, further comprising drying the infiltrated fabric and the infiltrated paper concurrently.

4. The method of any one of claims 1-3, wherein the inorganic fabric comprises a plurality of fibers comprising alumina, silica, mullite, zirconia, or any combination thereof.

5. The method of any one of claims 1-4, wherein the inorganic fabric is woven, nonwoven, or any combination thereof.

6. The method of any one of claims 1-4 or 5, wherein the inorganic paper comprises alumina, silica, mullite, zirconia, or any combination thereof.

7. The method of any one of claims 1-4, 5, or 6, wherein the oxide component of the first slurry mixture and/or the second slurry mixture comprises one of more oxides of aluminum, silicon, boron, zirconium, yttrium, or any combination thereof.

8. The method of claim 7, wherein the one or more oxides of the first slurry mixture and/or the second slurry mixture is provided as particles comprising spheres, hollow spheres, fibers, whiskers, or any combination thereof.

9. The method of claim 7 or claim 8, wherein the first slurry mixture and/or the second slurry mixture further comprises colloidal silica having a mean particle diameter of from about 1 nanometer to about 10 microns.

10. The method of claim 7 or claim 8, wherein the first slurry mixture and/or the second slurry mixture further comprises colloidal alumina having a mean particle diameter of from about 1 nanometer to about 10 microns.

11. The method of claim 9 or claim 8, wherein the liquid media soluble polymer is polyvinyl alcohol.

12. The method of any one of claims 1-4, 5, 6, or 7-10, wherein the liquid media of the first slurry mixture and/or the second slurry mixture is water, an alcohol, or any combination thereof.

13. The method of any one of claims 1-4, 5, 6, or 7, wherein the first slurry mixture and/or the second slurry mixture is an aqueous slurry mixture comprising:
from about 0.1 wt % to about 40 wt % colloidal silica;
from about 0.1 wt % to about 10 wt % liquid media soluble polymer;
from about 40 wt % to about 85 wt % aluminum oxide powder; and
from about 10 wt % to about 60 wt % water.

14. The method of claim 13, wherein the first slurry mixture and/or the second slurry mixture is an aqueous slurry mixture comprising:
from about 15 to about 30 wt % colloidal silica;
from about 0.1 to about 4 wt % liquid media soluble polymer;
from about 45 to about 65 wt % aluminum oxide powder; and
from about 20 to about 40 wt % water.

15. The method of any one of claims 1-4, 5, 6, or 7, wherein the first slurry mixture and/or the second slurry mixture is an alcohol-based slurry comprising:
from about 0.1 wt % to about 50 wt % of one or more organic binders, wherein the organic binder comprises silicon resin, polyvinyl butyral, polyvinyl acetate, polylactic acid, or any combination thereof;
from about 40 wt % to about 85 wt % aluminum oxide powder; and
from about 5 wt % to about 60 wt % alcohol, wherein the alcohol comprises methanol, ethanol, n-propanol, isopropanol, n-butanol, t-butanol, sec-butanol, $C_5$-$C_8$ alcohol, or any combination thereof.

16. The method of claim 15, wherein the first slurry mixture and/or the second slurry mixture is an alcohol-based slurry comprising:
from about 5 wt % to about 25 wt % of one or more organic binders, wherein the organic binder comprises silicon resin, polyvinyl butyral, polyvinyl acetate, polylactic acid, or any combinations thereof;
from about 45 wt % to about 65 wt % aluminum oxide powder; and
from about 30 wt % to about 50 wt % alcohol, wherein the alcohol comprises methanol, ethanol, n-propanol, isopropanol, n-butanol, t-butanol, sec-butanol, $C_5$-$C_8$ alcohol, or any combination thereof.

17. The method of any one of claims 1-4, 5, 6, or 7-16, wherein the pH of the first slurry mixture and/or the second slurry mixture is adjusted to a pH of from about 3 to about 5 using a protic acid.

18. The method of any one of claims 1-4, 5, 6, or 7-17, wherein the first slurry mixture and/or the second slurry mixture further comprises from about 0.1 wt % to about 2 wt % protic acid.

19. The method of claim 18, wherein the first slurry mixture and/or the second slurry mixture further comprises from about 0.1 wt % to about 1 wt % protic acid.

20. The method of any one of claims 1-4, 5, 6, or 7-17, wherein the first slurry mixture and/or the second slurry mixture further comprises one or more additives comprising inorganic polymeric materials, organic polymeric materials, one or more surfactants, one or more viscosity modifiers, glycols, polyols, or any combination thereof.

21. The method of any one of claims 1-4, 5, 6, or 7-20, further comprising curing the fabric-reinforced prepreg composite at a pressure of from about 10 psi to about 200 psi and at a temperature of from about 75° C. to about 500° C.

22. The method of claim 21, further comprising sintering the fabric-reinforced prepreg composite at a sintering temperature of from about 700° C. to about 1400° C.

23. The method of claim 22, wherein the sintering is accomplished using a heating rate of from about 1° C./minute to about 10° C./minute until the sintering temperature is achieved.

24. The method of any one claims 1-4, 5, 6, or 7-22, further comprising blending the first slurry mixture and/or the second slurry mixture using a high shear mixer, a ball mill, an attritor, a planetary, or any combination thereof.

25. The method of any one of claims 1-4, 5, 6, or 7-24, wherein the inorganic fabric is infiltrated with the first slurry mixture heated to an infiltrating temperature of from about 20° C. to about 150° C. and/or the inorganic paper is infiltrated with the second slurry mixture heated to an infiltrating temperature of from about 20° C. to about 150° C.

26. A method of forming a fabric-reinforced ceramic matrix composite article, the method comprising:
providing a prepreg composite comprising one or more layers of infiltrated fabric, wherein the infiltrated fabric comprises inorganic fabric infiltrated with a first slurry mixture comprising an oxide component and a liquid media, and wherein the one or more layers of the infiltrated fabric have a pre-infiltration thickness of from about 5 mm to about 75 mm prior to being infiltrated with the first slurry mixture;
contacting the prepreg composite with a surface of a preform;
applying an infiltrated paper to at least one surface of the prepreg composite to form a surface-treated prepreg composite, wherein the infiltrated paper comprises inorganic paper infiltrated with a second slurry mixture comprising an oxide component and a liquid media, and wherein the infiltrated paper has a thickness of from about 0.1 mm to about 4.99 mm prior to being infiltrated with the second slurry mixture; and
sintering the surface-treated prepreg composite at a sintering temperature of from about 700° C. to about 1400° C. to form the fabric-reinforced ceramic matrix composite article,
wherein the infiltrated paper includes non-woven, randomly oriented inorganic fibers that provide structural reinforcement in surface-treated prepreg composites and layups thereof where these inorganic fibers may take the form of chopped fibers, continuous fibers, filaments, tows, bundles, sheets, plies, or any combination thereof.

27. The method of claim 26, wherein the inorganic fabric comprises a plurality of fibers comprising alumina, silica, mullite, zirconia, or any combination thereof.

28. The method of any one of claims 26-27, wherein the infiltrated fabric is woven, nonwoven, or any combination thereof.

29. The method of any one of claims 26-27 or 28, wherein the inorganic paper comprises alumina, silica, mullite, zirconia, or any combination thereof.

30. The method of any one of claims 26-27, 28, or 29, wherein the oxide component of the first slurry mixture and/or the second slurry mixture comprises one of more oxides of aluminum, silicon, boron, zirconium, yttrium, or any combination thereof.

31. The method of claim 30, wherein the one or more oxides of the first slurry mixture and/or the second slurry mixture is provided as particles comprising spheres, hollow spheres, fibers, whiskers, or any combination thereof.

32. The method of claim 30 or claim 31, wherein the first slurry mixture and/or the second slurry mixture further comprises colloidal silica having a mean particle diameter of from about 1 nanometer to about 10 microns.

33. The method of claim 30 or claim 31, wherein the first slurry mixture and/or the second slurry mixture further comprises colloidal alumina having a mean particle diameter of from about 1 nanometer to about 10 microns.

34. The method of any one of claims 26-27, 28, 29, or 30-33, wherein the liquid media of the first slurry mixture and/or the second slurry mixture is water, an alcohol, or any combination thereof.

35. The method of any one of claims, 26-27, 28, 29, or 30, wherein the first slurry mixture and/or the second slurry mixture is an aqueous slurry mixture comprising:
from about 0.1 wt % to about 40 wt % colloidal silica;
from about 0.1 wt % to about 10 wt % liquid media soluble polymer;
from about 40 wt % to about 85 wt % aluminum oxide powder; and
from about 10 wt % to about 60 wt % water.

36. The method of claim 35, wherein the first slurry mixture and/or the second slurry mixture is an aqueous slurry mixture comprising:
from about 15 to about 30 wt % colloidal silica;
from about 0.1 to about 4 wt % liquid media soluble polymer;
from about 45 to about 65 wt % aluminum oxide powder; and
from about 20 to about 40 wt % water.

37. The method of claim 35 or claim 36, wherein the liquid media soluble polymer is polyvinyl alcohol.

38. The method of any one of claims 26-27, 28, 29, or 30, wherein the first slurry mixture and/or the second slurry mixture is an alcohol-based slurry comprising:
from about 0.1 wt % to about 50 wt % of one or more organic binders, wherein the organic binder comprises silicon resin, polyvinyl butyral, polyvinyl acetate, polylactic acid, or any combination thereof;
from about 40 wt % to about 85 wt % aluminum oxide powder; and
from about 5 wt % to about 60 wt % alcohol, wherein the alcohol comprises methanol, ethanol, n-propanol, isopropanol, n-butanol, t-butanol, sec-butanol, $C_5$-$C_8$ alcohol, or any combination thereof.

39. The method of claim 38, wherein the first slurry mixture and/or the second slurry mixture is an alcohol-based slurry comprising:
from about 5 wt % to about 25 wt % of one or more organic binders, wherein the organic binder comprises silicon resin, polyvinyl butyral, polyvinyl acetate, polylactic acid, or any combinations thereof;
from about 45 wt % to about 65 wt % aluminum oxide powder; and
from about 30 wt % to about 50 wt % alcohol, wherein the alcohol comprises methanol, ethanol, n-propanol, isopropanol, n-butanol, t-butanol, sec-butanol, $C_5$-$C_8$ alcohol, or any combination thereof.

40. The method of any one of claims 26-27, 28, 29, or 30-39, wherein the pH of the first slurry mixture and/or the second slurry mixture is adjusted to a pH of from about 3 to about 5 using a protic acid.

41. The method of any one of claims 26-27, 28, 29, or 30-39, wherein the first slurry mixture and/or the second slurry mixture further comprises from about 0.1 wt % to about 2 wt % protic acid.

42. The method of claim 41, wherein the first slurry mixture and/or the second slurry mixture further comprises from about 0.1 wt % to about 1 wt % protic acid.

43. The method of any one of claims 26-27, 28, 29, or 30-42, wherein the first slurry mixture and/or the second slurry mixture further comprises one or more additives comprising inorganic polymeric materials, organic polymeric materials, one or more surfactants, one or more viscosity modifiers, glycols, polyols, or any combination thereof.

44. The method of any one of claims 26-27, 28, 29, or 30-43, wherein the sintering is accomplished using a heating rate of from about 1° C./minute to about 10° C./minute until the sintering temperature is achieved.

45. A method of forming a fabric-reinforced ceramic matrix composite article, the method comprising:

provding a prepreg composite comprising one or more layers of infiltrated fabric, wherein the infiltrated fabric comprises inorganic fabric infiltrated with a first slurry mixture comprising an oxide component and a liquid media, and wherein the one or more layers of the infiltrated fabric have a pre-infiltration thickness of from about 5 mm to about 75 mm prior to being infiltrated with the first slurry mixture;

contacting the prepreg composite with a surface of a preform;

applying an infiltrated paper to at least one surface of the prepreg composite to form a surface-treated prepreg composite, wherein the infiltrated paper comprises inorganic paper infiltrated with a second slurry mixture comprising an oxide component and a liquid media, and wherein the infiltrated paper has a thickness of from about 0.1 mm to about 4.99 mm prior to being infiltrated with the second slurry mixture;

curing the surface-treated prepreg composite at a pressure of from about 10 psi to about 200 psi and at a temperature of from about 75° C. to about 500° C.; and sintering the surface-treated prepreg composite at a sintering temperature of from about 700° C. to about 1400° C. to form the fabric-reinforced ceramic matrix composite article, wherein the infiltrated paper includes non-woven, randomly oriented inorganic fibers that provide structural reinforcement in surface-treated prepreg composites and layups thereof where these inorganic fibers may take the form of chopped fibers, continuous fibers, filaments, tows, bundles, sheets, plies, or any combination thereof.

46. A method of forming a fabric-reinforced ceramic matrix composite article, the method comprising:

providing a prepreg composite comprising one or more layers of infiltrated fabric, wherein the infiltrated fabric comprises inorganic fabric infiltrated with a first slurry mixture comprising an oxide component and a liquid media, and wherein the one or more layers of the infiltrated fabric have a pre-infiltration thickness of from about 5 mm to about 75 mm prior to being infiltrated with the first slurry mixture;

curing the prepreg composite at a pressure of from about 10 psi to about 200 psi and at a temperature of from about 75° C. to about 500° C. to form a cured prepreg composite; and applying an infiltrated paper to at least one surface of the cured prepreg composite to form a surface-treated prepreg composite, wherein the infiltrated paper comprises inorganic paper infiltrated with a second slurry mixture comprising an oxide component and a liquid media, and wherein the infiltrated paper has a thickness of from about 0.1 mm to about 4.99 mm prior to being infiltrated with the second slurry mixture; and sintering the surface-treated prepreg composite at a sintering temperature of from about 700° C. to about 1400° C. to form the fabric-reinforced ceramic matrix composite article, wherein the infiltrated paper includes non-woven, randomly oriented inorganic fibers that provide structural reinforcement in surface-treated prepreg composites and layups thereof where these inorganic fibers may take the form of chopped fibers, continuous fibers, filaments, tows, bundles, sheets, plies, or any combination thereof.

* * * * *